US009786923B2

(12) United States Patent
Sumioka et al.

(10) Patent No.: US 9,786,923 B2
(45) Date of Patent: Oct. 10, 2017

(54) POROUS ELECTRODE SUBSTRATE, METHOD FOR MANUFACTURING SAME, MEMBRANE ELECTRODE ASSEMBLY, POLYMER ELECTROLYTE FUEL CELL, PRECURSOR SHEET, AND FIBRILLAR FIBERS

(71) Applicant: MITSUBISHI RAYON CO., LTD., Chiyoda-ku (JP)

(72) Inventors: Kazuhiro Sumioka, Aichi (JP); Shigeru Tanoue; Yoshihiro Sako, Hiroshima (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 15/391,769

(22) Filed: Dec. 27, 2016

(65) Prior Publication Data

US 2017/0110736 A1    Apr. 20, 2017

Related U.S. Application Data

(62) Division of application No. 13/980,774, filed as application No. PCT/JP2012/050677 on Jan. 16, 2012.

(30) Foreign Application Priority Data

Jan. 21, 2011  (JP) .................................. 2011-010559
Mar. 17, 2011  (JP) .................................. 2011-059443

(51) Int. Cl.
*H01M 8/10*    (2016.01)
*H01M 4/88*    (2006.01)
(Continued)

(52) U.S. Cl.
CPC ............ *H01M 4/8807* (2013.01); *D01F 9/22* (2013.01); *D21H 13/50* (2013.01);
(Continued)

(58) Field of Classification Search
CPC .. D21H 13/50; H01M 8/0234; H01M 4/8807; H01M 8/1002; H01M 4/96;
(Continued)

(56) References Cited

U.S. PATENT DOCUMENTS 5,230,960 A    7/1993   Iizuka
6,248,267 B1   6/2001   Hosako et al.
(Continued)

FOREIGN PATENT DOCUMENTS

EP    1 939 156 A1    7/2008
EP    2 453 506 A1    5/2012
(Continued)

OTHER PUBLICATIONS

International Search Report dated Apr. 24, 2012 in PCT/JP12/050677 Filed Jan. 16, 2012.
(Continued)

*Primary Examiner* — Gary Harris
(74) *Attorney, Agent, or Firm* — Oblon, McClelland, Maier & Neustadt, L.L.P.

(57) ABSTRACT

Provided is a porous electrode substrate having excellent thickness precision, gas permeability and conductivity, handling efficiency, low production costs and a high carbonization rate during carbonization. Also provided are a method for manufacturing such a substrate, a precursor sheet and fibrillar fiber used for forming such a substrate, along with a membrane electrode assembly and a polymer electrolyte fuel cell that contain such a substrate. The method for manufacturing a porous electrode substrate includes step (1) for manufacturing a precursor sheet in which short carbon (Continued)

fibers (A) and carbon fiber precursor (b) are dispersed, and step (2) for carbonizing the precursor sheet, and the volume contraction rate of carbon fiber precursor (b) in step (2) is 83% or lower. The present invention also relates to a porous electrode substrate obtained by such a manufacturing method, a precursor sheet and fibrillar fiber used for forming the substrate, along with a membrane electrode assembly and a polymer electrolyte fuel cell containing the substrate.

9 Claims, 2 Drawing Sheets

(51) Int. Cl.
    *H01M 8/0234* (2016.01)
    *H01M 4/86* (2006.01)
    *D01F 9/22* (2006.01)
    *D21H 13/50* (2006.01)
    *H01M 8/1018* (2016.01)

(52) U.S. Cl.
    CPC ....... *H01M 4/8605* (2013.01); *H01M 8/0234* (2013.01); *H01M 2008/1095* (2013.01)

(58) Field of Classification Search
    CPC ......... H01M 4/8605; H01M 2008/1095; Y02P 70/56; Y02E 60/50
    USPC .................................................. 429/481, 535
    See application file for complete search history.

(56) References Cited

U.S. PATENT DOCUMENTS

| | | |
|---|---|---|
| 2002/0175073 A1 | 11/2002 | Nakamura et al. |
| 2005/0100498 A1 | 5/2005 | Nakamura et al. |
| 2005/0150620 A1 | 7/2005 | Hamada et al. |
| 2006/0180798 A1 | 8/2006 | Chida et al. |
| 2007/0166524 A1 | 7/2007 | Nakamura et al. |
| 2008/0268297 A1 | 10/2008 | Quayle et al. |
| 2011/0294036 A1 | 12/2011 | Sumioka et al. |
| 2012/0100456 A1 | 4/2012 | Sumioka et al. |
| 2012/0115063 A1 | 5/2012 | Sumioka et al. |
| 2012/0141911 A1 | 6/2012 | Sumioka et al. |
| 2013/0224625 A1 | 8/2013 | Sumioka et al. |

FOREIGN PATENT DOCUMENTS

| | | | |
|---|---|---|---|
| JP | 3 213522 | 9/1991 | |
| JP | 9 324390 | 12/1997 | |
| JP | 10 165007 | 6/1998 | |
| JP | 10 168651 | 6/1998 | |
| JP | 2003-45443 A | 2/2003 | |
| JP | 2003 227054 | 8/2003 | |
| JP | 2004-259711 A | 9/2004 | |
| JP | 2004 363018 | 12/2004 | |
| JP | 2006 143478 | 6/2006 | |
| JP | 2006 299439 | 11/2006 | |
| JP | 2006 342487 | 12/2006 | |
| JP | 2006 348439 | 12/2006 | |
| JP | 2007 273466 | 10/2007 | |
| JP | 2008 044201 | 2/2008 | |
| JP | 2009 129634 | 6/2009 | |
| JP | 4409211 | 2/2010 | |
| JP | WO 2011004853 A1 * | 1/2011 | ............. D21H 13/50 |
| WO | 01 56103 | 8/2001 | |
| WO | 02 42534 | 5/2002 | |
| WO | 2006 033390 | 3/2006 | |
| WO | WO 2011/004853 | 1/2011 | |

OTHER PUBLICATIONS

Office Action dated Aug. 6, 2013 in Japanese Patent Application No. 2012-504588 with partial English language translation.
Partial Supplementary European Search Report dated Feb. 1, 2016, in corresponding European Patent Application No. EP 12 73 6945.

\* cited by examiner

POROUS ELECTRODE SUBSTRATE, METHOD FOR MANUFACTURING SAME, MEMBRANE ELECTRODE ASSEMBLY, POLYMER ELECTROLYTE FUEL CELL, PRECURSOR SHEET, AND FIBRILLAR FIBERS

TECHNICAL FIELD

The present invention relates to a porous electrode substrate to be used in a fuel cell and its manufacturing method, a membrane electrode assembly and a polymer electrolyte fuel cell containing such a porous electrode substrate, along with a precursor sheet and fibrillar fibers for producing such a porous electrode substrate.

BACKGROUND ART

To increase mechanical strength, a gasdiffusion electrode substrate in a fuel cell conventionally uses a porous electrode substrate, which is a sheet-type carbon-carbon composite made by forming short carbon fibers into a sheet, binding the fibers together with an organic polymer and sintering at high temperature to carbonize the organic polymer (see patent publication 1).

In addition, to enhance the conductivity of the above substrate, a type of substrate made by adding carbon powder to a carbonizable resin is proposed (see patent publication 2).

Moreover, to lower the cost, a porous electrode substrate is proposed, where a short oxidized fiber sheet is formed and sintered at high temperature to carbonize the short oxidized fibers (see patent publication 3).

Also proposed is a fuel cell gas diffusion layer formed with a mat containing multiple carbon fibers and multiple acrylic pulp fibers, which are incorporated into the carbon-fiber mat, cured and carbonized after being incorporated into the carbon-fiber mat (see patent publication 4).

To lower the cost, also proposed is a method for manufacturing a non-carbonized porous electrode substrate in which short carbon fibers are bound to each other by split fibers containing fibrillated portions made of a conductive substance and a water-repellent substance with a contact angle of 80 degrees or greater.

PRIOR ART PUBLICATION

Patent Publication

Patent Publication 1: international patent publication pamphlet 2001/056103
Patent Publication 2: Japanese laid-open patent publication 2006-143478
Patent Publication 3: international patent publication pamphlet 2002/042534
Patent Publication 4: Japanese laid-open patent publication 2007-273466
Patent Publication 5: Japanese laid-open patent publication 2004-363018

SUMMARY OF THE INVENTION

Problem(s) to be Solved by the Invention

However, the porous electrode substrate (porous carbon electrode substrate) disclosed in patent publication 1 has a complex manufacturing process and the production cost tends to be high, although the substrate has sufficient gas permeability and conductivity.

The porous electrode substrate disclosed in patent publication 2 displays mechanical strength, surface smoothness and gas permeability along with high conductivity gained by incorporating carbon fibers; however, the manufacturing process is complex and the production costs tend to be high.

Using the method for manufacturing a carbon-fiber sheet (porous electrode substrate) disclosed in patent publication 3, the production cost may be reduced; however, contraction may be notable during sintering, and uneven thickness or warping of the sheet are observed in a porous electrode substrate.

The cost for forming a porous electrode substrate disclosed in patent publication 4 may be reduced; however, since carbonization rates may be low when carbonizing the acrylic pulp, it is necessary to add more acrylic pulp to improve handling efficiency.

Since no carbonization step is included in forming a porous electrode substance disclosed in patent publication 5, the production costs are substantially low. However, conductivity may be insufficient in the split fibers containing fibrillated portions, which are made of a water-repellent substance and a conductive substance and bind short carbon fibers. Accordingly, low conductivity of the porous electrode substrate has been observed occasionally.

The objective of the present invention is to provide a porous electrode substrate and its manufacturing method for solving the problems described above while achieving high thickness precision, excellent gas permeability and conductivity, excellent handling efficiency, low production costs, and a high carbonization rate during carbonization. Another objective of the present invention is to provide a precursor sheet and fibrillar fibers for producing such a porous electrode substrate, as well as a membrane electrode assembly and a polymer electrolyte fuel cell containing the porous electrode substrate.

Solution(s) to the Problem(s)

The inventors of the present invention have found that the above problems are solved by the following [1]~[19] according to the invention.

[1] A method for manufacturing a porous electrode substrate includes step (1) for manufacturing a precursor sheet in which short carbon fibers (A) and carbon fiber precursor (b) are dispersed; and step (2) for carbonizing the precursor sheet, and the volume contraction rate of the carbon fiber precursor (b) in step (2) is 83% or lower.

[2] In the manufacturing method described in [1] above, the carbon fiber precursor (b) is a carbon fiber precursor containing carbon powder.

[3] In the manufacturing method described in [1] or [2] above, the carbon fiber precursor (b) is a fibrillar carbon fiber precursor.

[4] In the manufacturing method described in [1] or [2] above, the carbon fiber precursor (b) is both or either one of the following: a short carbon fiber precursor containing an acrylonitrile-based polymer with 95% by mass or more of acrylonitrile units; and/or a fibrillar carbon fiber precursor containing an acrylonitrile-based polymer with 95% by mass or more of acrylonitrile units.

[5] The manufacturing method described in any one of [1]~[4] above includes step (3) for performing entanglement treatment on the precursor sheet between the steps (1) and (2).

[6] The manufacturing method described in any one of [1]~[4] above includes step (4) for hot pressing the precursor sheet between the steps (1) and (2).

[7] The manufacturing method described in [5] above includes step (4) for hot pressing the precursor sheet between the steps (3) and (2).

[8] The manufacturing method described in [6] or [7] above includes step (5) for oxidizing the hot pressed precursor sheet between the steps (4) and (2).

[9] A porous electrode substrate obtained by a manufacturing method described in any one of [1]~[8] above.

[10] A porous electrode substrate formed by binding dispersed short carbon fibers (A) to each other by carbon containing carbon powder.

[11] A porous electrode substrate formed by binding dispersed short carbon fibers (A) to each other by three-dimensional mesh-like carbon containing carbon powder.

[12] A membrane electrode assembly containing the porous electrode substrate described in any one of [9]~[11] above.

[13] A polymer electrolyte fuel cell containing the membrane electrode assembly described in [12] above.

[14] A precursor sheet in which short carbon fibers (A) and carbon fiber precursor (b) are dispersed, and when the precursor sheet is sintered, the volume contraction rate of the carbon fiber precursor (b) during sintering is set at 83% or lower.

[15] A precursor sheet in which short carbon fibers (A) and a carbon fiber precursor containing carbon powder are dispersed.

[16] A precursor sheet in which short carbon fibers (A) and a fibrillar carbon fiber precursor containing carbon powder are dispersed.

[17] In a precursor sheet, short carbon fibers (A) are dispersed along with a short carbon fiber precursor made of an acrylonitrile-based polymer with 95% by mass or more of acrylonitrile units and/or a fibrillar carbon fiber precursor containing an acrylonitrile-based polymer with 95% by mass or more of acrylonitrile units.

[18] In the precursor sheet described in [15] above, the carbon fiber precursor containing carbon powder is both or either one of the following: a short carbon fiber precursor made of carbon powder and an acrylonitrile-based polymer with 95% by mass or more of acrylonitrile units; and/or a fibrillar carbon fiber precursor containing carbon powder and an acrylonitrile-based polymer with 95% by mass or more of acrylonitrile units.

[19] Fibrillar fibers made of carbon powder and an acrylonitrile-based polymer.

Effect(s) of the Invention

According to the embodiments of the present invention, a porous electrode substrate and its manufacturing method are provided for achieving high thickness precision, gas permeability and conductivity, excellent handling efficiency, low production costs, and a high carbonization rate during carbonization. Also, according to the embodiments of the present invention, a precursor sheet and fibrillar fibers for producing such a porous electrode substrate are provided along with a membrane electrode assembly and a polymer electrolyte fuel cell containing the porous electrode substrate.

MODE TO CARRY OUT THE INVENTION

<Porous Electrode Substrate>

Figure 1:
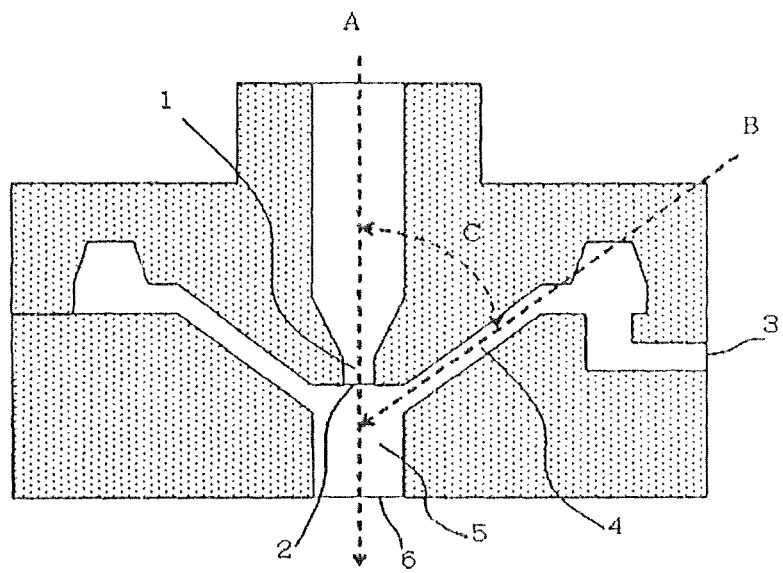
FIG. 1 a cross-sectional view schematically showing an example of a nozzle to be used for producing a carbon fiber precursor with a structure of numerous branched fibrils.

A porous electrode substrate obtained by a manufacturing method according to an embodiment of the present invention has a structure where short carbon fibers (A) are bound to each other by carbon (B) derived from carbon fiber precursor (b). Such a porous electrode substrate is made of dispersed short carbon fibers (A) and carbon (B). The porous electrode substrate according to the present embodiment can be used as a porous electrode substrate for a polymer electrolyte fuel cell.

Considering handling efficiency and conductivity, carbon (B) is preferred to be carbon containing carbon powder (carbon derived from carbon fiber precursor (b1) containing carbon powder). Also, when considering handling efficiency and conductivity, short carbon fibers (A) in the porous electrode substrate are preferred to be bound to each other by mesh-like carbon. Furthermore, considering handling efficiency and conductivity, it is more preferable for a porous electrode substrate to have a structure where dispersed short carbon fibers (A) are bound to each other by three-dimensional mesh-like carbon, and short carbon fibers (A) and carbon (B) are entangled with each other.

The porous electrode substrate above is obtained by carbonizing a carbon fiber precursor sheet in which short carbon fibers (A) and carbon fiber precursor (b) are dispersed. Namely, carbon (B) is obtained when carbon fiber precursor (b) dispersed in a precursor sheet is carbonized. In a precursor sheet, short carbon fibers (A) and carbon fiber precursor (b) are dispersed in a two-dimensional plane, and may further be dispersed three dimensionally. In addition, prior to carbonization, at least one of entanglement treatment, hot press molding and oxidation treatment may be performed on the precursor sheet as needed.

The shape of a porous electrode substrate is selected from among those well known in the fuel cell field. For example, it may be a plate, coil or the like.

The basis weight of a sheet-type porous electrode substrate is preferred to be 15 g/m$^2$ or more but 100 g/m$^2$ or less, considering gas permeability and handling efficiency. Also, the porosity rate of the sheet-type porous electrode substrate is preferred to be 50% or greater but 90% or less from a viewpoint of gas permeability and conductivity. Moreover, the thickness of a sheet-type porous electrode substrate is preferred to be 50 µm or greater but 300 µm or less considering gas permeability, conductivity and handling efficiency. In addition, the undulation of a sheet-type porous electrode substrate is preferred to be less than 5 mm.

The gas permeability of a porous electrode substrate is preferred to be 500 mL/hr/cm$^2$/mmAq or greater but 20000 mL/hr/cm$^2$/mmAq or less.

Also, the electric resistance of a porous electrode substrate in a thickness direction (through-plane electric resistance) is preferred to be 50 mΩ·cm$^2$ or less. Methods for measuring gas permeability and through-plane electric resistance of a porous electrode substrate are described later.

<Short Carbon Fibers (A)>

Short carbon fibers (A) dispersed in a precursor sheet are one type of the fibers that form a porous electrode substrate.

Carbon fibers such as polyacrylonitrile-based carbon fibers (hereinafter referred to as "PAN-based carbon fibers"), pitch-based carbon fibers and rayon-based carbon fibers, which are cut to a predetermined fiber length, are listed to be used as short carbon fibers (A). Considering the mechanical strength of a porous electrode substrate, PAN-based carbon fibers are preferred.

The average fiber length of short carbon fibers (A) is preferred to be 2 mm or longer but 20 mm or shorter when dispersibility is considered. Average fiber lengths are measured using an optical microscope or electron microscope. Considering production costs and dispersibility of short carbon fibers, the average fiber diameter of short carbon fibers (A) is preferred to be 3 μm or greater but 9 μm or less, and it is more preferred to be 4 μm or greater but 8 μm or less from a viewpoint of smoothness features of the porous electrode substrate. Average fiber diameters are measured using an optical microscope or electron microscope.

Short carbon fibers (A), one type of the fibers that form a porous electrode substrate, are dispersed in the porous electrode substrate. Here, "dispersed in a porous electrode substrate" means short carbon fibers (A) are present substantially parallel to a surface of a sheet-type porous electrode substrate, or in a thickness direction of the porous electrode substrate. The orientation of short carbon fibers (A) approximately parallel to the surface of a sheet-type porous electrode substrate may actually be at random or may be denser in a specific direction. In a porous electrode substrate, short carbon fibers (A) exist while maintaining substantially a straight-line shape. Also, short carbon fibers (A) are bound by carbon (B) but not bound directly to each other.

<Carbon (B)>

Carbon (B) indicates the carbon that binds short carbon fibers (A) to each other. Carbon (B) is bent or curved at the bound portions. Considering handling efficiency and conductivity, carbon (B) is preferred to be mesh-like, and more preferably three-dimensional mesh-like.

The amount of carbon (B) in a porous electrode substrate is preferred to be 10% by mass or more but 90% by mass or less to make it easier to maintain appropriate mechanical strength of the porous electrode substrate, and more preferably, 15% by mass or more but 70% by mass or less.

Carbon (B) is obtained by carbonizing carbon fiber precursor (b). Thus, carbon (B) is the type of carbon derived from carbon fiber precursor (b). Carbon (B) is preferred to contain carbon powder, considering conductivity and productivity. The amount of carbon powder in carbon (B) is preferred to be 10% by mass or more but 90% by mass or less.

<Determining Whether or not Carbon (B) is Three-Dimensional Mesh-Like>

In the present embodiment, whether or not carbon (B) is three-dimensional mesh-like is determined by observing the cross section of a sheet-type material to be measured (porous electrode substrate) and by measuring the angle between carbon (B) at the cross section and the sheet surface of the material to be measured. The cross section to be observed is a portion cut in a direction perpendicular to the sheet surface of the sheet-type material to be measured.

Figure 3:
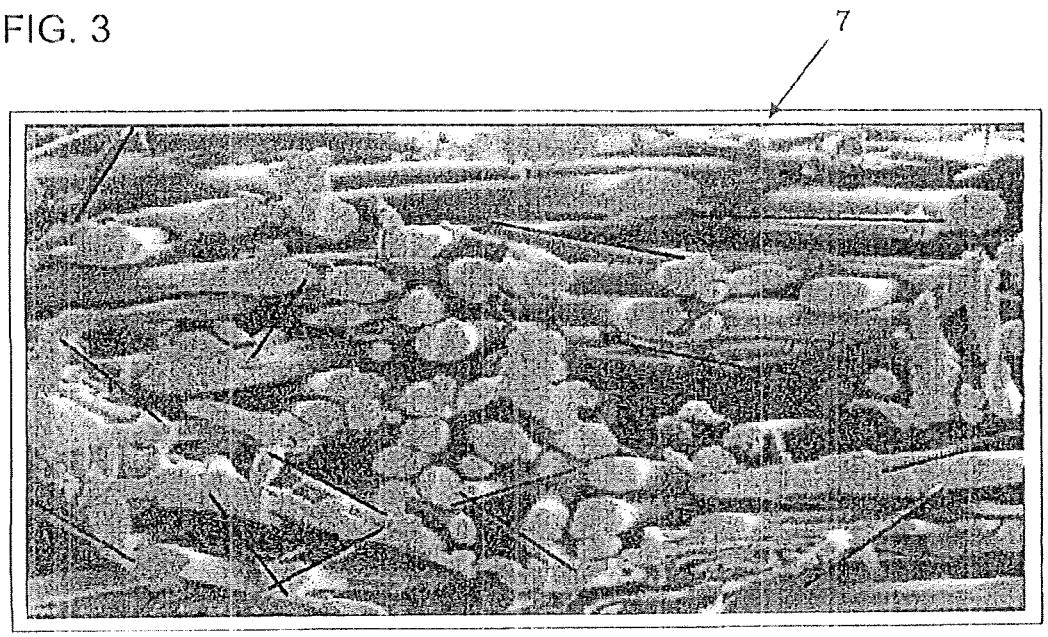
FIG. 3 a view to illustrate a method for measuring the angle of carbon (B) to a horizontal surface.

If the average angle between carbon (B) and a horizontal surface (sheet surface) is measured at 3 degrees or greater, carbon (B) is determined to have a three-dimensional mesh-like structure. If the average angle between carbon (B) and a horizontal surface (sheet surface) is measured at 2 degrees or smaller, carbon (B) is determined not to have a three-dimensional mesh-like structure. Specifically, as shown in FIG. 3, an SEM (scanning electron microscope) photograph is taken at a cross section in a direction perpendicular to the sheet surface, and spots of carbon (B) are connected by a line so that the angle between the line and the sheet surface is measured. Straight line 7 in FIG. 3 is a line parallel to the sheet surface. The number of spots to measure for calculating the average angle may be 50, for example.

<Precursor Sheet>

In the present embodiment, a precursor sheet is manufactured by step (1). The precursor sheet is a sheet that becomes a precursor of a porous electrode substrate. In the precursor sheet obtained in step (1), short carbon fibers (A) and carbon fiber precursor (b) are dispersed. The precursor sheet is made of short carbon fibers (A) and carbon fiber precursor (b). Considering handling efficiency, conductivity and productivity, the volume contraction rate of carbon fiber precursor (b) when the precursor sheet is sintered (carbonized) is set at 83% or lower.

The following are listed for precursor sheets that satisfy the above conditions, for example. When a porous electrode substrate is manufactured, it is an option to select one of those precursor sheets, or to combine two or more types.

(i) a precursor sheet in which short carbon fibers (A), and carbon fiber precursor (b1) containing carbon powder, are dispersed.

(i-1) a precursor sheet where short carbon fibers (A), and short carbon fiber precursor (b1-1) containing carbon powder, are dispersed.

(i-2) a precursor sheet where short carbon fibers (A), and fibrillar carbon fiber precursor (b1-2) containing carbon powder, are dispersed.

(ii) a precursor sheet where short carbon fibers (A) and fibrillar carbon fiber precursor (b2) are dispersed.

(iii) a precursor sheet where short carbon fibers (A), and carbon fiber precursor (b3) containing an acrylonitrile-based polymer with 95% by mass or more of acrylonitrile units, are dispersed.

(iii-1) a precursor sheet where short carbon fibers (A) and both or either one of the following are dispersed: short carbon fiber precursor (b3-1) containing an acrylonitrile-based polymer with 95% by mass or more of acrylonitrile units; and/or fibrillar carbon fiber precursor (b3-2) containing an acrylonitrile-based polymer with 95% by mass or more of acrylonitrile units.

(iii-1-1) a precursor sheet where short carbon fibers (A) and both or either one of the following are dispersed: short carbon fiber precursor (b3-1-1) made of an acrylonitrile-based polymer with 95% by mass or more of acrylonitrile units; and/or fibrillar carbon fiber precursor (b3-2) containing an acrylonitrile-based polymer with 95% by mass or more of acrylonitrile units.

(iv) a precursor sheet where short carbon fibers (A), carbon powder, and carbon fiber precursor (b4) containing an acrylonitrile-based polymer with 95% by mass or more of acrylonitrile units are dispersed.

(iv-1) a precursor sheet where short carbon fibers (A) and both or either one of the following are dispersed: short carbon fiber precursor (b4-1) made of an acrylonitrile-based polymer with 95% by mass or more of acrylonitrile units and carbon powder; and/or fibrillar carbon fiber precursor (b4-2) containing an acrylonitrile-based polymer with 95% by mass or more of acrylonitrile units and carbon powder.

In the following, each fiber that forms a porous electrode substrate and/or a precursor sheet is described.

<Carbon-Fiber Precursor (B)>

In the present embodiment, the volume contraction rate of carbon fiber precursor (b) in step (2) is set at 83% or lower, considering handling efficiency, conductivity and productivity. The volume contraction rate of carbon fiber precursor (b) is more preferred to be 60% or lower. Also, the lower the volume contraction rate of carbon fiber precursor (b) in step (2), the better it is.

The volume contraction rate in step (2) means the rate at which the volume of original carbon fiber precursor (b) is contracted when carbon fiber precursor (b) is carbonized to make carbon (B) (the substance formed by carbonizing carbon fiber precursor (b) in step (2)). In particular, volume contraction rates are calculated by the following equation 1.

$$\text{volume contraction rate (\%)} = ((b_v - B_v)/b_v) \times 100 \quad \text{equation 1}$$

(In equation 1, $b_v$ means the volume of carbon fiber precursor (b), and $B_v$ means the volume of carbon (B)).

The volume of each fiber or carbon (B) is calculated from fiber density, the density of each porous electrode substrate, the basis weight of each porous electrode substrate or precursor sheet, and the combination ratio of each fiber in a precursor sheet.

For example, using the following carbon fiber precursor (b), the volume contraction rate of carbon fiber precursor (b) in step (2) is set at 83% or lower. It is an option to use one of the following types of carbon fiber precursor (b) or a combination thereof. The amounts of short carbon fibers (A) and carbon fiber precursor (b) to be combined for forming a precursor sheet may be appropriately adjusted according to short carbon fibers (A) and the type or the like of carbon fiber precursor (b) used therein.

(I) carbon fiber precursor (b1) containing carbon powder
  (I-1) short carbon fiber precursor (b1-1) containing carbon powder
  (I-2) fibrillar carbon fiber precursor (b1-2) containing carbon powder
(II) fibrillar carbon fiber precursor (b2)
(III) carbon fiber precursor (b3) containing an acrylonitrile-based polymer with 95% by mass or more of acrylonitrile units
  (III-1) short carbon fiber precursor (b3-1) containing an acrylonitrile-based polymer with 95% by mass or more of acrylonitrile units
  (III-1-1) short carbon fiber precursor (b3-1-1) made of an acrylonitrile-based polymer with 95% by mass or more of acrylonitrile units
  (III-2) fibrillar carbon fiber precursor (b3-2) containing an acrylonitrile-based polymer with 95% by mass or more of acrylonitrile units
  (III-2-1) fibrillar carbon fiber precursor (b3-2-1) made of an acrylonitrile-based polymer with 95% by mass or more of acrylonitrile units
(IV) carbon fiber precursor (b4) containing carbon powder and an acrylonitrile-based polymer with 95% by mass or more of acrylonitrile units
  (IV-1) short carbon fiber precursor (b4-1) made of carbon powder and acrylonitrile-based polymer with 95% by mass or more of acrylonitrile units
  (IV-2) fibrillar carbon fiber precursor (b4-2) containing carbon powder and an acrylonitrile-based polymer with 95% by mass or more of acrylonitrile units
  (IV-2-1) fibrillar carbon fiber precursor (b4-2-1) made of carbon powder and an acrylonitrile-based polymer with 95% by mass or more of acrylonitrile units <(I) Carbon Fiber Precursor (b1) Containing Carbon Powder>

In carbon fiber precursor (b1) containing carbon powder, carbon powder is contained in each fiber strand in the carbon fiber precursor. The dispersion state of carbon powder in the carbon fiber precursor is not limited specifically, and carbon powder may be dispersed homogeneously among fibers or localized in the core or surface of the fibers. As for carbon fiber precursor (b1) containing carbon powder, it is an option to use both or either one of the following, for example: short carbon fiber precursor (b1-1) containing carbon powder; and/or fibrillar carbon fiber precursor (b1-2) containing carbon powder.

As for carbon fiber precursor (b1) containing carbon powder, one type of carbon fiber precursor (b1) containing carbon powder may be used. It is an option to combine multiple types of carbon fiber precursor (b1) in which freeness, fiber diameter, type of polymer, type of carbon powder, mass ratio of carbon powder to the polymer, and the like are different from each other. In addition, it is another option to use both short carbon fiber precursor (b1-1) and fibrillar carbon fiber precursor (b1-2), both containing carbon powder. However, considering the handling efficiency of a precursor sheet, fibrillar carbon fiber precursor (b1-2) containing carbon powder is preferred to be used as carbon fiber precursor (b1) containing carbon powder.

Depending on types of carbon fiber precursor (b1) containing carbon powder, combination ratios, the ratio to be combined with short carbon fibers (A), and whether or not oxidation treatment was conducted, ratios to remain as carbon containing carbon powder are different in a porous electrode substrate to be obtained in the end. When carbon fiber precursor (b1) containing carbon powder is used alone, the ratio of short carbon fibers (A) to carbon fiber precursor (b1) containing carbon powder is preferred to be as follows. Namely, the ratio is preferred to be 50~300 parts by mass of carbon fiber precursor (b1) based on 100 parts by mass of short carbon fibers (A). By setting carbon fiber precursor (b1) containing carbon powder at 50 parts by mass or greater, the resulting amount of carbon containing carbon powder increases, thus making it easier to enhance the strength of the porous electrode substrate sheet. When the amount of carbon fiber precursor (b1) containing carbon powder is 300 parts by mass or less, contraction of a sheet during carbonization is suppressed more surely, because a smaller amount of short carbon fibers (A), which suppress the contraction of carbon fiber precursor (b1) during carbonization, would result in the contraction of a sheet. Accordingly, it is easier to enhance the handling efficiency and strength of a porous electrode substrate.

As for carbon powders, carbon blacks such as FONESU black, acetylene black, lamp black, thermal black and Ketchen black, black graphite such as flaky graphite and nodular graphite, or any combination thereof, may be used. To express conductivity and to maintain the sheet shape, those carbon powders are preferable.

Carbon fiber precursor (b1) containing carbon powder may be made of carbon powder and a polymer. The amount of carbon powder in carbon fiber precursor (b1) is preferred to be 10 parts by mass or greater based on 100 parts by mass of a polymer used therein because carbonization rates during carbonization notably improve. In addition, the maximum amount of carbon powder is preferred to be as high as within a range of spinnability. However, 60 parts by mass or lower is especially preferred considering spinning stability during the process for manufacturing fibers.

To achieve lower cost and lower environmental load, the remaining amount of polymer in carbon fiber precursor (b1) containing carbon powder is preferred to be 20% by mass or greater after carbonization (step (2)).

As for the polymers described above, acrylonitrile-based polymers, cellulose-based polymers and phenol-based polymers are listed. Among them, acrylonitrile-based polymers are preferred, considering spinnability, ability to bind short carbon fibers (A) to each other in a range of low to high temperatures, carbonization rates during carbonization, entanglement with short carbon fibers (A), and sheet strength.

Acrylonitrile-based polymers may be a homopolymer of acrylonitrile, or a copolymer of acrylonitrile and another monomer. Acrylonitrile-based polymers are preferred to contain 50% by mass or greater of acrylonitrile units, more preferably 90% by mass or greater considering spinnability and carbonization rates during carbonization. Monomers to be copolymerized with acrylonitrile are not limited to any specific type as long as they are unsaturated monomers that are generally used for acrylic fibers: for example, acrylic acid esters such as methyl acrylate, ethyl acrylate, isopropyl acrylate, n-butyl acrylate, 2-ethylhexyl acrylate, 2-hydroxyethyl acrylate, and hydroxypropyl acrylate; methacrylic acid esters such as methyl methacrylate, ethyl methacrylate, isopropyl methacrylate, n-butyl methacrylate, isobutyl methacrylate, t-butyl methacrylate, n-hexyl methacrylate, cyclohexyl methacrylate, lauryl methacrylate, 2-hydroxyethyl methacrylate, hydroxypropyl methacrylate, and diethylaminoethyl methacrylate; acrylic acid, methacrylic acid, maleic acid, itaconic acid, acrylamide, N-methylolacrylamide, diacetone acrylamide, styrene, vinyl toluene, vinyl acetate, vinyl chloride, vinylidene chloride, vinylidene bromide, vinyl fluoride, and vinylidene fluoride. The carbonization rates of acrylonitrile-based polymers during carbonization are preferred to be 30% by mass or greater.

The weight-average molecular weight of acrylonitrile-based polymers is not limited specifically, but it is preferred to be 50000~one million. When the weight-average molecular weight of acrylonitrile-based polymers is 50000 or more, spinnability is enhanced while the yarn quality of fibers tends to be better. When the weight-average molecular weight of acrylonitrile-based polymers is one million or less, the polymer density to provide optimal viscosity for the spinning stock solution rises, and productivity tends to improve.

Manufacturing carbon fiber precursor (b1) containing carbon powder is not limited to any specific method. For example, short carbon fiber precursor (b1-1) and fibrillar carbon fiber precursor (b1-2) manufactured by later-described methods may be used as carbon fiber precursor (b1). Fibrillar fibers such as those in fibrillar carbon fiber precursor (b1-2) can be made from carbon powder and acrylonitrile-based polymers. Acrylonitrile-based polymers may be acrylonitrile homopolymers and/or copolymers of acrylonitrile and other monomers.

Short Carbon Fiber Precursor (b1-1) Containing Carbon Powder

Short carbon fiber precursor (b1-1) containing carbon powder may be obtained when a long carbon fiber precursor containing carbon fiber is cut to appropriate size.

The average fiber length of short carbon fiber precursor (b1-1) is preferred to be 2 mm or longer but 20 mm or shorter from a viewpoint of dispersibility. The average fiber lengths are measured using an optical microscope or electron microscope. The cross-sectional shape of short carbon fiber precursor (b1-1) is not limited specifically, but a shape closer to a perfect circle is preferred, considering production costs and mechanical strength after carbonization. Also, the average diameter of short carbon fiber precursor (b1-1) is preferred to be 20 μm or less to suppress breakage caused by contraction during carbonization. Average fiber sizes (diameters) are measured using an optical microscope or electron microscope.

Short carbon fiber precursor (b1-1) containing carbon powder can be manufactured by a generally known spinning method using carbon powder and polymers. For example, when an acrylonitrile-based polymer is used as the polymer, the following method is employed: a spinning stock solution is prepared in which the acrylonitrile-based polymer and carbon powder are dissolved in a solvent, or dispersed in a dispersion medium; long fibers are produced by spinning the spinning stock solution by well-known spinning methods such as dry spinning and wet spinning; and the long fibers are cut to size.

Fibrillar Carbon Fiber Precursor (b1-2) Containing Carbon Powder

An example of fibrillar carbon fiber precursor (b1-2) containing carbon powder is shown in Japanese patent publication 4409211, for example. One specific example is a carbon fiber precursor that contains carbon powder and has a structure where numerous fibrils with a diameter of a few microns or smaller (0.1~3 μm, for example) branch out from fibrous stems with a diameter of 100 μm or smaller (approximately 0.1~30 μm, for example). When such fibrillar carbon fiber precursor (b1-2) is used, short carbon fibers (A) and fibrillar carbon fiber precursor (b1-2) containing carbon powder are well entangled in a precursor sheet, making it easier to obtain a precursor sheet with excellent handling efficiency and mechanical strength. Regarding the freeness of fibrillar carbon fiber precursor (b1-2) containing carbon powder, using fibrillar fibers with a lower freeness generally results in better mechanical strength of a precursor sheet, while the gas permeability of the porous electrode substrate tends to decrease.

In addition, manufacturing fibrillar carbon fiber precursor (b1-2) is not limited to any specific method, but injection-coagulation methods are preferred since it is easier to control freeness. Fibrillar carbon fiber precursor (b1-2) containing carbon powder is manufactured by an injection-coagulation method using an apparatus shown in FIG. 1 and the following process, for example: a spinning stock solution is prepared in which raw material for a fibrillar carbon fiber precursor containing carbon powder (such as an acrylonitrile-based polymer and carbon black) is dissolved in a solvent or dispersed in a dispersion medium, and discharged through a spinning discharge nozzle into a mixing cell, while steam is injected into the mixing cell with an angle of zero degree or greater but smaller than 90 degrees against the discharge direction of the spinning stock solution; and a fibrillar carbon fiber precursor containing carbon powder is coagulated under shear flow in the mixing cell. When the coagulated body along with steam and the above-mentioned solvent or the dispersion medium is discharged into a coagulation solution from the mixing cell, a fibrillar carbon fiber precursor containing carbon powder is obtained. As for a coagulation solution, water, or a mixed solution of water and the above-mentioned solvent or dispersion medium may be used.

Fibrillar carbon fiber precursor (b1-2) containing carbon powder obtained above is formed with fibrillated portions of fibers with a small fiber diameter and core portions with a greater fiber diameter coagulated without being greatly exposed to the steam. Fibrillated portions of fibrillar carbon fiber precursor (b1-2) containing carbon powder entangle well with short carbon fibers (A) as well as with other fibrillated portions of fibrillar carbon fiber precursor (b1-2) containing carbon powder, and the core portions of fibrillar carbon fiber precursor (b1-2) containing carbon powder exhibit strength as a binder. The fiber diameter in fibrillated portions is preferred to be 2 μm or smaller to entangle better with the short carbon fibers with which they are to be mixed.

The diameter of core portions is preferred to be 100 μm or smaller to form a homogeneous porous electrode substrate. By setting the diameter to be 100 μm or smaller, uneven distribution of fibrillar carbon fiber precursor (b1-2) containing carbon powder is suppressed more certainly, making it easier to bind short carbon fibers (A) with a relatively small amount of fibrillar carbon fiber precursor (b1-2) containing carbon powder. In addition, the diameter of the core portions is preferred to be 10 μm or greater to express strength.

When considering the function of fibrillar carbon fiber precursor (b1-2) containing carbon powder to entangle with short carbon fibers, multiple fibrillated portions of fibrillar carbon fiber precursor (b1-2) containing carbon powder are preferred to exist for every core portion. The greater the number of fibrillated portions existing for every core section, the better it is thought to be.

In a strand of fibrillar carbon fiber precursor (b1-2) containing carbon powder, the width of a core portion is preferred to be constant or varied gradually. By so setting, it is easier to prevent weaker portions created where the width of a core portion changes in steps. Accordingly, it is easier to prevent decreased strength of the core portion. When fibrillar carbon fiber precursor (b1-2) containing carbon powder is manufactured by the above method, it is difficult to maintain a constant width of core portions because steam scatters at random. In such a case, the width of core portions may vary. When the injected steam cools down to form droplets, that tends to cause the width of core portions to change in steps. Thus, by increasing the pressure of injecting steam and its temperature, it is easier to prevent the width of core portions from changing in steps.

<(II) Fibrillar Carbon Fiber Precursor (b2)>

A list of fibers for fibrillar carbon fiber precursor (b2) is, for example, a fibrillar carbon fiber precursor containing carbon powder, a fibrillar carbon fiber precursor containing an acrylonitrile-based polymer with 95% by mass or greater of acrylonitrile units, and a fibrillar carbon fiber precursor containing such an acrylonitrile-based polymer and carbon powder. Those fibrillar carbon fiber precursors (b2) are the same as fiber (b1-2), fiber (b3-2) and fiber (b4-2) respectively, and their detailed descriptions are provided when each fiber is described.

<(III) Carbon Fiber Precursor (b3) Containing Acrylonitrile-Based Polymer with 95% by Mass or Greater of Acrylonitrile Units>

Since an acrylonitrile-based polymer with 95% by mass or greater of acrylonitrile units is used when preparing a spinning stock solution for forming carbon fiber precursor (b3), its carbonization rate during carbonization is high.

As for carbon fiber precursor (b3), for example, both or either one of the following may be used: short carbon fiber precursor (b3-1) containing an acrylonitrile-based polymer with 95% by mass or greater of acrylonitrile units; and/or fibrillar carbon fiber precursor (b3-2) containing an acrylonitrile-based polymer with 95% by mass or greater of acrylonitrile units. Hereinafter, an acrylonitrile-based polymer with 95% by mass or greater of acrylonitrile units may be referred to as "acrylonitrile-based polymer (I)".

Acrylonitrile-based polymer (I) may be a homopolymer of acrylonitrile, or a copolymer of acrylonitrile and another monomer. For example, a list of monomers to be copolymerized with acrylonitrile is as follows: acrylic acid esters such as methyl acrylate, ethyl acrylate, isopropyl acrylate, n-butyl acrylate, 2-ethylhexyl acrylate, 2-hydroxyethyl acrylate, and hydroxypropyl acrylate; methacrylic acid esters such as methyl methacrylate, ethyl methacrylate, isopropyl methacrylate, n-butyl methacrylate, isobutyl methacrylate, t-butyl methacrylate, n-hexyl methacrylate, cyclohexyl methacrylate, lauryl methacrylate, 2-hydroxyethyl methacrylate, hydroxypropyl methacrylate, and diethylaminoethyl methacrylate; acrylic acid, methacrylic acid, maleic acid, itaconic acid, acrylamide, N-methylolacrylamide, diacetone acrylamide, styrene, vinyl toluene, vinyl acetate, vinyl chloride, vinylidene chloride, vinylidene bromide, vinyl fluoride, and vinylidene fluoride.

Acrylonitrile-based polymer (I) contains 95% by mass or greater of acrylonitrile as described above, and the amount to remain after carbonization can be 30% by mass or greater. Also, the volume contraction rates of carbon fiber precursors (b) after carbonization can be set at 83% or lower. If the amount of acrylonitrile-based polymers remaining after carbonization is 30% by mass or greater, the carbonization rate can be easily set high for carbonization treatment.

The weight-average molecular weight of acrylonitrile-based polymer (I) is not limited specifically, but it is preferred to be 50000 or greater but one million or less. When the weight-average molecular weight is set at 50000 or more, spinnability is enhanced while the yarn quality of the fibers is improved. When the weight-average molecular weight is set at one million or less, the polymer density to provide optimal viscosity for the spinning stock solution rises, and productivity tends to improve.

(Short Carbon Fiber Precursor (b3-1) Containing Acrylonitrile-Based Polymer (I))

As for short carbon fiber precursor (b3-1), for example, short carbon fiber precursor (b3-1-1) made of acrylonitrile-based polymer (I) may be used. Also, it is an option for carbon fiber precursor (b3-1) to contain carbon powder. The description of carbon fiber precursor (b3) containing carbon powder will be provided later when carbon fiber precursor (b4) is described.

Short carbon fiber precursor (b3-1-1) may be formed by cutting to appropriate size a long carbon fiber precursor made of acrylonitrile-based polymer (I).

The average fiber length of short carbon fiber precursor (b3-1-1) is preferred to be 2 mm or longer but 20 mm or shorter from a viewpoint of dispersibility. Average fiber lengths are measured using an optical microscope or electron microscope.

The cross-sectional shape of short carbon fiber precursor (b3-1-1) is not limited specifically, but a shape closer to a perfect circle is preferred considering production costs and mechanical strength after carbonization. Also, the average diameter of short carbon fiber precursor (b3-1-1) is preferred to be 5 μm or less to suppress breakage caused by contraction during carbonization. Average fiber sizes (diameters) are measured using an optical microscope or electron microscope.

Short carbon fiber precursor (b3-1-1) made of acrylonitrile-based polymer (I) may be one type, or multiple types with different fiber diameters or containing different polymers. Depending on the type of short carbon fiber precursor (b3-1-1) or later-described fibrillar carbon fiber precursor (b3-2), and their combination ratio with short carbon fibers (A), or depending on whether or not oxidation treatment at 200° C. or higher but 300° C. or lower is conducted, the amount of carbon (B) remaining in a porous electrode substrate to be obtained in the end is adjusted.

When short carbon fiber precursor (b3-1) (especially fiber (b3-1-1)) and fibrillar carbon fiber precursor (b3-2) (especially later-described fiber (b3-2-1-1) and/or fiber (b3-2-2-1)) are used as carbon fiber precursor (b), the total amount of fibers (b3-1) and (b3-2) contained in a precursor sheet is preferred to be 10% by mass or greater but 90% by mass or less, or more preferably 30% by mass or greater but 80% by mass or less, based on 100% by mass of the precursor sheet, to provide appropriate mechanical strength for the porous electrode substrate.

<Fibrillar Carbon Fiber Precursor (b3-2) Containing Acrylonitrile-Based Polymer (I)>

The following may be used for a fibrillar carbon fiber precursor (b3-2), for example.

(b3-2-1): a fibrillar carbon fiber precursor made of the above acrylonitrile-based polymer (I).

(b3-2-1-1): a carbon fiber precursor with a structure where numerous fibrils with a diameter of a few microns or less (0.1~3 μm, for example) branch out from a fibrous stem with a diameter of 100 μm or less.

(b3-2-2): a fibrillar carbon fiber precursor made of acrylonitrile-based polymer (I) and one or more types of polymers (methacrylic resin, for example) other than acrylonitrile-based polymer (I).

(b3-2-2-1): short carbon fiber precursor fibrillated by beating.

When such types of fibrillar carbon fiber precursor (b3-2) are used, it is easier to obtain a precursor sheet where short carbon fibers (A) and a fibrillar carbon fiber precursor (b3-2) are well entangled in the precursor sheet, and handling efficiency and mechanical strength are excellent.

The freeness of a fibrillar carbon fiber precursor (b3-2) is not limited specifically. When a fibrillar fiber with a low freeness degree is used, the mechanical strength of a precursor sheet generally improves, but the gas permeability of the porous electrode substrate tends to decrease.

As for a fibrillar carbon fiber precursor (b3-2), one type of fiber (b3-2-1-1) or one type of fiber (b3-2-2-1) may be used. Alternatively, multiple types of those fibers with different freeness degrees, fiber diameters, different mass ratios of acrylonitrile in an acrylonitrile-based polymer and the like may be used.

A detailed description of those fibrillar carbon fiber precursors (b3-2) is provided below.

Carbon Fiber Precursor (b3-2-1-1) with Structure of Numerous Branched Fibrils

As described above, fiber (b3-2-1-1) is a carbon fiber precursor having a structure where numerous fibrils with a diameter of a few microns or smaller (0.1~3 μm, for example) branch out from a fibrous stem with a diameter of 100 μm or smaller. Fiber (b3-2-1-1) may be made of an acrylonitrile-based polymer containing 95% by mass or greater of acrylonitrile. A polymer used in fiber (b3-2-1-1) is preferred to be an acrylonitrile-based polymer containing acrylonitrile at 95% by mass or greater with a remaining amount after carbonization at 30% by mass or greater.

A method for manufacturing fiber (b3-2-1-1) is not limited specifically, but an injection-coagulation method is preferred because it is easier to control the degree of freeness.

FIG. 1 shows a cross-sectional view of an example of the nozzle to be used for manufacturing split fiber having fibrillated portions. Following is a method for manufacturing fiber (b3-2-1-1) by an injection-coagulation method using the nozzle.

First, an acrylonitrile-based polymer containing acrylonitrile at 95% by mass or greater is dissolved in a solvent to prepare a spinning stock solution. As for such a solvent, for example, dimethylamide, dimethylformamide, dimethyl sulfoxide or the like may be used. Next, the spinning stock solution is supplied to channel 1 (channel for a spinning stock solution for manufacturing split fibers), while steam is provided from inlet 3 (inlet for steam) to slit steam channel 4. Then, the spinning stock solution is discharged to mixing cell 5 through outlet 2 (outlet for spinning stock solution for manufacturing split fibers) while steam is injected into mixing cell 5. Then, the acrylonitrile-based polymer is coagulated under shear flow in mixing cell 5. At that time, angle (C) made by direction (A) of discharging the spinning stock solution and direction (B) of injecting steam is set at zero degree or greater but smaller than 90 degrees. Next, the obtained coagulated body along with the solvent and steam is discharged from outlet 6 of the mixing cell into a coagulation solution. Accordingly, fiber (b3-2-1-1) is obtained. As for a coagulation solution, water or a mixed solution of water and the solvent may be used.

Fiber (b3-2-1-1) obtained above has fibrillated portions of fibers with a narrow fiber diameter and stem portions with a wider fiber diameter coagulated without making much contact with steam. Such fibrillated portions of fiber (b3-2-1-1) entangle well with short carbon fibers (A) as well as with other fibrillated portions of fiber (b3-2-1-1), and the core portions (stem portions) of fiber (b3-2-1-1) express strength as a binder.

The diameter of fibers in fibrillated portions of fiber (b3-2-1-1) is preferred to be 2 μm or smaller to enhance entanglement with short carbon fibers (A) with which they are mixed.

The diameter of core portions is preferred to be 100 μm or smaller to form a homogeneous porous electrode substrate. By setting the diameter to be 100 μm or smaller, it is easier to suppress uneven distribution of fiber (b3-2-1-1), and it is also easier to bind short carbon fibers (A) with a relatively small amount of fiber (b3-2-1-1). In addition, to express strength, the diameter of stem portions is preferred to be 10 μm or greater. Considering the function of fiber (b3-2-1-1) to be entangled with short carbon fibers (A), multiple fibrillated portions of fiber (b3-2-1-1) are preferred to exist for every core portion. A greater number of fibrillated portions is thought to be preferred to exist for every core portion.

In a strand of fiber (b3-2-1-1), the width of the stem portion is preferred to be constant or varied gradually. By so setting, it is easier to prevent weaker portions where the width of the stem portion changes in steps. Accordingly, it is easier to prevent decreased strength. When fiber (b3-2-1-1) is manufactured by the above method, it may be difficult to maintain a constant width of stem portions because the steam scatters at random. In such a case, the width of a stem portion may vary. However, since change in the width of a stem portion in steps tends to occur when the injected steam cools down to form droplets, it is easier to prevent such change in the width of a stem portion in steps by increasing the pressure of injecting steam and its temperature.

Short Carbon Fiber Precursor (b3-2-2-1) Fibrillated Through Beating

Fiber (b3-2-2-1) may be formed by cutting long splittable sea-island composite fibers into appropriate size and by fibrillating them through beating using a refiner or pulper. Long splittable sea-island composite fibers are manufactured using two or more different polymers which dissolve in a common solvent but are incompatible with each other (at least one of them is an acrylonitrile-based polymer containing acrylonitrile at 95% by mass or greater). At least one of the polymers is preferred to be an acrylonitrile-based polymer containing acrylonitrile at 95% by mass or greater with a remaining amount at 30% by mass or greater after carbonization.

Regarding the acrylonitrile-based polymer containing 95% by mass or greater of acrylonitrile in fiber (b3-2-2-1), its amount is preferred to be 40% by mass or greater to increase the carbonization rate during carbonization. The amount of the acrylonitrile-based polymer in fiber (b3-2-2-1) corresponds to the amount of the acrylonitrile-based polymer in the long splittable sea-island composite fiber.

When an acrylonitrile-based polymer, which contains 95% by mass or greater of acrylonitrile and its amount to remain after carbonization is 30% by mass or greater, is used as one of the polymers in a splittable sea-island composite fiber, it is preferred that the other polymer dissolve in the common solvent with the acrylonitrile-based polymer and that stability be maintained in the spinning stock solution in which both polymers are dissolved. Namely, it is preferred that the other polymer be incompatible with the acrylonitrile-based polymer when dissolved in the common solvent with the acrylonitrile-based polymer, but have compatibility to such a degree that a sea-island structure is formed in a spinning process. By setting so, it is easier to prevent heterogeneous properties of the fiber caused when two polymers are significantly incompatible, while thread breakage in a spinning process is prevented. Moreover, it is easier to form fibers. In addition, the other polymer is preferred to be insoluble in water. Accordingly, during wet spinning, the other polymer is prevented from falling out by dissolving into water in a coagulation tank or cleansing tank.

A list of other polymers that satisfy such requirements includes polyvinyl chloride, polyvinylidene chloride, polyvinylidene fluoride, polyvinyl pyrrolidone, cellulose acetate, acrylic resin, methacrylic resin, phenol resin and the like, for example. Among those, cellulose acetate, acrylic resin and methacrylic resin are preferred considering the need to balance the above-mentioned requirements. One type or two or more types of other polymers may be used.

Splittable sea-island composite fibers used in fiber (b3-2-2-1) are made by a regular wet spinning method. First, an acrylonitrile-based polymer containing acrylonitrile at 95% by mass or greater and another polymer is dissolved in a solvent to prepare a spinning stock solution. Alternatively, a spinning stock solution prepared by dissolving an acrylonitrile-based polymer containing acrylonitrile at 95% by mass or greater, and another spinning stock solution prepared by dissolving another polymer in a solvent are mixed by a static mixer or the like to form the spinning stock solution.

As for solvents, dimethylamide, dimethylformamide, dimethyl sulfoxide and the like may be used. The spinning stock solution is supplied to a spinning apparatus to spin fibers through the nozzle. Then, hot wet stretching, washing, drying and hot dry stretching are conducted to obtain splittable sea-island composite fibers.

A cross section of splittable sea-island composite fibers is not limited to any specific shape. The fineness of splittable sea-island composite fibers is preferred to be 1 dtex or greater but 10 dtes or lower to enhance dispersibility and to suppress breakage caused by contraction during carbonization. The average length of splittable sea-island composite fibers is preferred to be 1 mm or longer but 20 mm or shorter, considering dispersibility after being refined.

When splittable sea-island composite fibers are beaten, external mechanical force causes interfacial peeling, and at least some of the fibers become split and fibrillated. Beating is not limited to any specific method; for example, a refiner, pulper, beater, or high-pressure water injection (water-jet punching) may be used to fibrillate fibers.

When splittable sea-island composite fibers are refined through interfacial peeling caused by external mechanical force, the fibrillated state may vary depending on the method and duration of beating. To evaluate the degree of fibrillation, it is an option to evaluate the freeness degree based on ISO-5267-2 (Canadian standard freeness method). Fiber (b3-2-2-1) is not limited to any specific freeness degree.

<(IV) Carbon Fiber Precursor (b4) Containing Acrylonitrile-Based Polymer (I) and Carbon Powder>

In carbon fiber precursor (b4) described above, carbon powder is contained in each strand of fiber. Carbon powder in the carbon fiber precursor is not limited to any specific dispersion state. Carbon powder may be dispersed homogeneously, or locally in the core or fiber surface portion. A list of fibers (b4) includes short carbon fiber precursor (b4-1) made of acrylonitrile-based polymer (I) and carbon powder, and fibrillar carbon fiber precursor (b4-2) containing acrylonitrile-based polymer (I) and carbon powder. It is an option for fiber (b4-2) to contain other polymers such as methacrylic resin. Carbon powder and acrylonitrile-based polymer (I) in fiber (b4) may be those used in fiber (b1) and fiber (b3).

When only fiber (b4) is used as carbon fiber precursor (b), the combination ratio of short carbon fibers (A) to carbon fiber precursor (b) is preferred to be as follows. Namely, the ratio is preferred to be 50~300 parts by mass of fiber (b4) based on 100 parts by mass of short carbon fibers (A).

The amount of carbon powder in fiber (b4) is preferred to be 10 parts by mass or greater based on 100 parts by mass of the polymer used therein, since the carbonization rate during carbonization improves notably at such a ratio. Also, the maximum density of carbon powder is preferred to be as high as within a range that allows fiber spinning. For example, 60 parts by mass or lower is preferred considering spinning stability in a fiber production process.

(Short Fiber Carbon Precursor (b4-1) Made of Acrylonitrile-Based Polymer (I) and Carbon Powder)

Fiber (b4-1) may be formed by cutting to size a long carbon fiber precursor made of acrylonitrile-based polymer (I) and carbon powder. The average fiber length of fiber (b4-1) is preferred to be 2 mm or longer but 20 mm or shorter from a viewpoint of dispersibility. Average fiber length is measured using an optical microscope or electron microscope. Also, the average diameter of fiber (b4-1) is preferred to be 5 μm or smaller to suppress breakage caused by contraction during carbonization. Average fiber size (diameters) is measured using an optical microscope or electron microscope. Fiber (b4-1) may be formed by the same method as for above-mentioned fiber (b1-1) using corresponding materials (acrylonitrile-based polymer (I) and carbon powder).

(Fibrillar Carbon Fiber Precursor (b4-2) Containing Acrylonitrile-Based Polymer (I) and Carbon Powder)

A list of fibers (b4-2) is as follows: fibrillar carbon fiber precursor (b4-2-1) made of acrylonitrile-based polymer (I) and carbon fiber; and fibrillar carbon fiber precursor (b4-2-2) made of acrylonitrile-based polymer (I), carbon powder, and one or more types of polymers other than acrylonitrile-based polymer (I).

Fiber (b4-2-1) may be carbon fiber precursor (b4-2-1-1) which contains carbon powder and has a structure where numerous fibrils branch out, for example. As for fiber (b4-2-2), short carbon fiber precursor (b4-2-2-1) which contains carbon powder and is fibrillated through beating may be listed, for example. Those fibers are produced by the same method for the above-mentioned fiber (b3-2) using corresponding materials.

<Method for Manufacturing Porous Electrode Substrate>

As for a method for manufacturing a porous electrode substrate according to an embodiment of the present invention, it is not limited specifically, as long as it includes the following steps (1) and (2) and the volume contraction rate of carbon fiber precursor (b) in step (2) is 83% or lower.
(1) Step (1) for manufacturing a precursor sheet in which short carbon fibers (A) and carbon fiber precursor (b) are dispersed.
(2) Step (2) for carbonizing the precursor sheet.

Between steps (1) and (2), it is an option to conduct step (3) for performing entanglement treatment on the precursor sheet.

It is another option to conduct step (4) for hot pressing the precursor sheet between steps (1) and (2). When step (3) is conducted between steps (1) and (2), step (4) for hot pressing the precursor sheet may be included between steps (3) and (2).

It is yet another option to conduct step (5) for oxidizing the hot pressed precursor sheet between steps (4) and (2).

Each step is described in detail in the following.

Step (1) for Manufacturing Precursor Sheet

A precursor sheet is manufactured by applying sheet-forming methods such as follows: a wet sheet-forming method of dispersing short carbon fibers (A) and carbon fiber precursor (b) in a liquid medium; and a dry method of dispersing short carbon fibers (A) and carbon fiber precursor (b) in the air and piling them. However, a wet method is preferred because highly homogeneous properties are achieved in the obtained sheet.

Carbon fiber precursor (b) is used to help short carbon fibers (A) open into single fibers and prevent the opened single fibers from converging again. Also, a binder may be used if necessary during the wet sheet-forming process.

A binder works as an adhesive to adhere each component in a precursor sheet containing short carbon fibers (A) and carbon fiber precursor (b). As for such a binder, polyvinyl alcohol (PVA), polyvinyl acetate and the like may be used. Using polyvinyl alcohol is more preferred, since excellent binding force is obtained in the sheet-forming step while short carbon fibers (A) are less likely to fall out. It is an option to make a binder into a fibrous shape and use it accordingly in the present embodiment.

In the present embodiment, a precursor sheet is obtained without using a binder, where short carbon fibers (A) and carbon fiber precursor (b) are appropriately entangled.

A medium such as water or alcohol in which carbon fiber precursor (b) does not dissolve may be used as a liquid medium for dispersing short carbon fibers (A) and carbon fiber precursor (b), for example. Among those, water is preferred from a viewpoint of productivity.

To combine short carbon fibers (A) and carbon fiber precursor (b), they may be mixed and dispersed in water or they may be directly combined together. A method for mixing and dispersing fibers in water is preferred since fibers are dispersed homogeneously. When a precursor sheet is prepared, by combining short carbon fibers (A) and carbon fiber precursor (b) and forming them into a sheet, the strength of the precursor sheet is enhanced. Also, during such process, short carbon fibers (A) are prevented from peeling off from the precursor sheet to cause change in the orientation of short carbon fibers (A).

Although precursor sheets are manufactured either by a batch method or a continuous method, a continuous method is preferred considering the productivity and mechanical strength of precursor sheets.

The basis weight of a precursor sheet is 10 g/m$^2$ or more but 200 g/m$^2$ or less considering the handling efficiency of the precursor sheet, and by considering gas permeability, conductivity and handling efficiency when it is made into a porous electrode substrate. Also, the thickness of a precursor sheet is preferred to be 20 μm or more but 400 μm or less.

Step (2) for Carbonization

The precursor sheet obtained in step (1) may be carbonized directly afterward. Alternatively, as described above, carbonization may be conducted after forming an entangled structure (after step (3)), or after hot-press molding the sheet (after step (4)). Yet alternatively, carbonization may be conducted after oxidizing the hot-press molded precursor sheet (after step (5)). By binding short carbon fibers (A) using carbon fiber precursor (b) and by oxidizing carbon fiber precursor (b) to form carbon (B) (mesh-like carbon, for example), it is easier to enhance the mechanical strength and conductivity of the obtained porous electrode substrate.

Carbonization is preferred to be conducted in an inactive gas to enhance conductivity of a porous electrode substrate to be obtained. Usually, carbonization is conducted at a temperature of 1000° C. or higher. The temperature range for carbonization is preferred to be 1000~3000° C., more preferably, 1000~2200° C. An approximate duration for carbonization is 10 minutes to an hour, for example. A preliminary treatment such as sintering in an inactive atmosphere at approximately 300~800° C. may be conducted prior to carbonization.

When carbonizing precursor sheets manufactured continuously, the entire length of precursor sheets is preferred to be continuously carbonized to reduce production costs. Continuously forming porous electrode substrates in one long entity increases the productivity of porous electrode substrates, and subsequent MEAs (membrane electrode assemblies) can also be manufactured continuously, thus leading to lower production costs of fuel cells. In addition, it is preferred to continuously wind porous electrode substrates as they are being manufactured, considering productivity and production costs of porous electrode substrates and fuel cells.

Step (3) for Entanglement Treatment

Entanglement treatment for short carbon fibers (A) and carbon fiber precursor (b) in a precursor sheet may be performed using any well-known method as long as an entanglement structure is formed. For example, mechanical entanglement such as needle-punching, high-pressure liquid injection such as water-jet punching or high-pressure gas injection such as steam-jet punching, or a combination thereof, may be used. High-pressure liquid injection is preferred since it is easier to suppress breakage of short carbon fibers (A) during entanglement treatment and to obtain an appropriate entanglement structure. The method is described in detail in the following.

(High-Pressure Liquid Injection)

High-pressure liquid injection is conducted as follows: a precursor sheet is placed on a support member with a smooth surface, and liquid column flow, liquid fan flow, liquid slit flow or the like is injected at a pressure of 1 MPa to entangle short carbon fibers (A) and carbon fiber precursor (b) in a precursor sheet. Here, a support member with substantially a smooth surface is selected as desired so that the pattern of the support member will not be transferred to the entangled body and the injected liquid will be removed promptly.

Specific examples are a screen, plastic net or roll with 30~200 mesh. Considering production costs, it is preferred to manufacture precursor sheets on a support member with substantially a smooth surface, and then to perform entanglement treatment by high-pressure liquid injection.

A liquid for high-pressure liquid injection may be any type except for a solvent that dissolves the fibers in a precursor sheet. Usually, water or hot water is preferred. If it is a column flow, the aperture size of each spray nozzle hole of the high-pressure spray nozzle is preferred to be 0.01 mm or greater but 1.0 mm or smaller, more preferably 0.05 mm or greater but 0.3 mm or smaller, to achieve sufficient entanglement effects. The distance between the spray nozzle holes and the laminate is preferred to be 0.5 cm or greater but 5 cm or less. The liquid pressure is preferred to be 0.5 MPa or greater, more preferably 1.0 MPa or greater. Entanglement treatment may be performed in a single row or multiple rows. When multiple-row treatment is employed, it is effective if the pressure for the second and subsequent rows is set higher than the pressure in the first row during high-pressure liquid injection.

Entanglement treatment on a precursor sheet by high-pressure liquid injection may be repeated multiple times. Namely, after conducting high-pressure liquid injection on a precursor sheet, another precursor sheet is laminated and high-pressure liquid injection is repeated. Alternatively, it is an option to invert a precursor sheet during entanglement processing and to continue high-pressure liquid injection from the opposite side. Yet alternatively, such procedures may be repeated.

When precursor sheets with an entangled structure are continuously manufactured, a high-pressure liquid injection nozzle with nozzle holes arrayed in a single row or multiple rows may be oscillated in a crosswise direction of the sheets. It is easier to suppress striped patterns from forming in a lengthwise direction due to uneven density in the sheets. When striped patterns are suppressed from occurring in a lengthwise direction of the sheets, it is easier to achieve crosswise mechanical strength of the sheets. When using multiple high-pressure liquid injection nozzles with nozzle holes arrayed in a single row or multiple rows, cyclic patterns appearing on precursor sheets with an entangled structure may easily be suppressed by controlling the frequency or phase differences when high-pressure liquid injection nozzles are oscillated in a crosswise direction of the sheets.

Step (4) for Hot-Press Molding

To bind short carbon fibers (A) with carbon fiber precursor (b) and to reduce uneven thickness of a porous electrode substrate, it is preferred to hot-press mold a precursor sheet prior to carbonization. To hot-press mold a precursor sheet, any technology may be employed as long as the sheet is uniformly hot-press molded. For example, a method for hot pressing by applying smooth steel plates from both surfaces of a precursor sheet, a roll-pressing apparatus, or a continuous belt-pressing apparatus may be used.

When hot-press molding is conducted on continuously manufactured precursor sheets, methods using a roll-pressing apparatus or continuous belt-pressing apparatus are preferred. By using such a method, carbonization is conducted continuously.

The temperature for hot-press molding is preferred to be lower than 200° C., more preferably 120~190° C., to form a smooth surface effectively on a precursor sheet. The molding pressure is not limited specifically, but a smooth surface is formed on a precursor sheet at a relatively low molding pressure when the amount of carbon fiber precursor (b) contained in a precursor sheet is high. Molding pressure is preferred to be 20 kPa or higher but 10 MPa or lower. When the pressure is 10 MPa or lower, it is easier to prevent breakage of short carbon fibers (A) during hot-press molding, thus preventing the texture of a porous electrode substrate from becoming too fine. The duration for hot-press molding is 10 seconds to 10 minutes, for example.

When hot-press molding is conducted by sandwiching a precursor sheet between two steel plates or using a roll-pressing apparatus or continuous belt-pressing apparatus, it is preferred to apply a release agent in advance so that carbon fiber precursor (b) does not stick to the steel plates or belt, or to interpose a release paper between a precursor sheet and the steel plates or belt.

Step (5) for Oxidation

To better bind short carbon fibers (A) with a fiber precursor (b) and to enhance the carbonization rate of carbon fiber precursor (b), the precursor sheet is preferred to be oxidized after hot-press molding. The oxidation temperature is preferred to be 200° C. or higher but lower than 300° C., more preferably 240° C. or higher but 290° C. or lower to enhance carbonization rates. The duration for oxidation is set to be one minute to 2 hours, for example.

For oxidation treatment, it is preferred to employ continuous oxidization using a porous hot plate to apply direct heat and pressure, or a hot roller and the like to intermittently apply direct heat and pressure, because the cost is low and it is easier to bind short carbon fibers (A) with carbon fiber precursor (b). When continuously manufactured precursor sheets are oxidized, the entire length of the precursor sheets is preferred to be oxidized continuously, because that makes it easier to conduct oxidation treatment continuously.

The porous electrode substrate related to the present invention is manufactured by the methods described below.

Steps in a first method are conducted in the following order: step (1) for manufacturing a precursor sheet by dispersing above-described short carbon fibers (A) and a carbon fiber precursor (b); and step (2) for oxidizing the precursor sheet at a temperature of 1000° C. or higher.

Steps in a second method are conducted in the following order: step (1); step (3) for forming an entangled structure by conducting entanglement treatment on the precursor sheet obtained in step (1); and step (2).

Steps in a third method are conducted in the following order: step (1); step (3); step (4) for hot-press molding the precursor sheet obtained in step (3) at a temperature of lower than 200° C.; and step (2).

Steps in a fourth method are conducted in the following order: step (1); step (4) for hot-press molding the precursor sheet obtained in step (1) at a temperature of lower than 200° C.; and step (2).

Steps in a fifth method are conducted in the following order: step (1); step (3); step (4); step (5) for oxidizing the hot-press molded precursor sheet at a temperature of 200° C. or higher but lower than 300° C.; and step (2).

Steps in a sixth method are conducted in the following order: step (1); step (4); step (5) for oxidizing the hot-press molded precursor sheet at a temperature of 200° C. or higher but lower than 300° C.; and step (2).

EXAMPLES

In the following, the present invention is further described in detail with reference to examples. The value of each physical property or the like was measured as shown below. "Part" means "part by mass."

(1) Gas Permeability

Based on ISO-5636-5, the time for 200 mL of air to permeate a porous electrode substrate was measured using a Gurley Densometer so that the gas permeability (mL/hr/cm$^2$/mmAq) of a porous electrode substrate was calculated.

(2) Thickness

The thickness of a porous electrode substrate was measured using a thickness gauge (brand name: Dial Thickness Gauge 7321, made by Mitutoyo Corp.) The size of the gauge head was 10 mm in diameter, and the measuring pressure was set at 1.5 kPa.

(3) Through-Plane Electric Resistance

A porous electrode substrate was sandwiched with gold-plated copper plates and pressurized at 1 MPa in a vertical direction of the copper plates, and then electric current was flowed at a current density of 10 mA/cm$^2$ and the resistance value was measured. The electric resistance of a porous electrode substrate in a thickness direction (through-plane electric resistance) was calculated by the equation below.

through-plane electric resistance (mΩ·cm$^2$)= measured resistance value (mΩ)×sample area (cm$^2$).

(4) Amount of Carbon (B)

The amount of carbon (B) contained in a porous electrode substrate was calculated based on the basis weight of the obtained porous electrode substrate and the basis weight of short carbon fibers (A) used therein by the following equation.

amount (%) of carbon (B)=[basis weight of porous electrode substrate (g/m$^2$)−basis weight of short carbon fibers (A) (g/m$^2$)]÷basis weight of porous electrode substrate (g/m$^2$)×100

(5) Undulation of Porous Electrode Substrate

As for an undulation index of a porous electrode substrate, a 250 mm-long×250 mm-wide porous electrode substrate was set on a plate, and the difference was calculated between the maximum value and the minimum value of the height of the porous electrode substrate.

(6) Carbonization Rate of Carbon Fiber Precursor (b)

Based on the basis weight of the obtained porous electrode substrate, and the basis weights of short carbon fibers (A) and fiber precursor (b) used therein, the carbonization rate of fiber precursor (b) was calculated as follows:

carbonization rate (%) of fiber precursor (b)= [basis weight of porous electrode substrate (g/m$^2$)−basis weight of short carbon fibers (A) (g/m$^2$)]÷basis weight of fiber precursor (b) (g/m$^2$)×100

(7) Volume Contraction Rate of Fiber Precursor (b)

The volume contraction rate of fiber precursor (b) was calculated as follows:

volume contraction rate (%)=$((b_v - B_v)/b_v) \times 100$   equation 1

($b_v$ means the volume of carbon fiber precursor (b), and $B_v$ means the volume of carbon (B)).

More specifically, the volume contraction rate of fiber precursor (b) was calculated based on the basis weight of the obtained porous electrode substrate and basis weights of short carbon fibers (A) and fiber precursor (b) used therein, the true density of the porous electrode substrate, and the densities of short carbon fibers (A) and fiber precursor (b) used therein. Here, specific gravities were measured using a density-gradient tube.

volume contraction rate (%) of fiber precursor (b)= (1−(basis weight of porous electrode substrate (g/m$^2$)×true density of porous electrode substrate (g/cm$^3$)−basis weight of short carbon fibers (A) (g/m$^2$)×density of short carbon fibers (A) (g/cm$^3$))/basis weight of fiber precursor (b) (g/m$^2$)×density of fiber precursor (b) (g/cm$^3$)×100

(Manufacturing Example 1) Manufacturing Short Carbon Fiber Precursor (b3-1-1)

A spinning stock solution was prepared as follows: 250 grams of an acrylonitrile-based polymer, having a weight-average molecular weight of 140000 and a composition of acrylonitrile/acrylamide/methacrylic acid=97/2.5/0.5 (mass ratio) synthesized through aqueous suspension polymerization, was dissolved and blended into 750 grams of dimethylacetamide using a three-one motor. Next, wet spinning was conducted by extruding the obtained mixed solution (spinning stock solution) under a nitrogen atmosphere pressurized at 0.1 MPa. Then, the stock solution was discharged using a gear pump through a nozzle with 12000 holes into a dimethylformamide solution set at a density of 30% by mass and a temperature of 35° C. Then, after the coagulated fiber was stretched sixfold in a priming solution, washed and desolventized, the fiber was cut to a length of 3 mm to obtain short carbon fiber precursor (b3-1-1) with an average fiber diameter of 5 μm made of an acrylonitrile-based polymer containing 95% by mass or greater of acrylonitrile.

(Manufacturing Example 2) Manufacturing Carbon Fiber Precursor (b3-2-1-1) with Structure of Numerous Branched Fibrils A spinning stock solution was prepared as follows: 150 grams of an acrylonitrile-based polymer, having a weight-average molecular weight of 140000 and a composition of acrylonitrile/acrylamide/methacrylic acid=97/2.5/0.5 (mass ratio) synthesized through aqueous suspension polymerization, was dissolved and blended into 850 grams of dimethylacetamide using a three-one motor. Next, the mixed solution under a nitrogen atmosphere pressurized at 0.1 MPa was extruded, and the mixed solution was supplied at a constant rate using a gear pump to channel 1 of the nozzle shown in FIG. 1, while steam was provided through inlet 3 to steam channel 4. The amount of steam supply was determined by controlling the supply pressure using a decompression valve. The nozzle was set as follows: Y-shaped solution discharge outlet 2, cylindrical mixing cell 5 with a diameter of 2 mm and a length of 10 mm, steam slit channel 4 with an adjusted aperture of 390 μm, and angle (C) made by center line (A) of the solution channel and center line (B) of the slit to be set at 60 degrees. Using such a nozzle, under conditions of the solution supply amount of 36 mL/min and steam supply pressure of 350 kPa, the mixed solution was extruded from mixing cell outlet 6 into 30° C. water. The acrylonitrile-based polymer floating in the coagulation bath was collected, washed with water at room temperature overnight, and dewatered to form carbon fiber precursor (b3-2-1-1) made of an acrylonitrile-based polymer containing 95% by mass or greater of acrylonitrile and having a structure of numerous branched fibrils. When the freeness of fibrillar carbon fiber precursor (b3-2-1-1) was measured based on ISO-5267-2 using a pulp freeness testing (1) Canadian standard method, it was 175 mL.

Water was added to carbon fiber precursor (b3-2-1-1) to set the fiber density at 1% by mass to obtain slurry. Then, the slurry was formed into a 25 cm×25 cm sheet with a basis weight of 30 g/cm², and dried for a contact drying time of 3 minutes using a 130° C. drum dryer (brand name HP-124AP, made by Hashiina) to form a sheet. The obtained sheet was observed by a scanning electron microscope, and the fiber was confirmed to be fibrillated.

(Manufacturing Example 3) Manufacturing Short Carbon Fiber (b3-2-2-1) Fibrillated by Beating A spinning stock solution for an acrylonitrile-based polymer was prepared as follows: 200 grains of an acrylonitrile-based polymer, having a weight-average molecular weight of 140000 and a composition of acrylonitrile/acrylamide/methacrylic acid=97/2.5/0.5 (mass ratio) synthesized through aqueous suspension polymerization, was dissolved and blended into 600 grams of dimethylacetamide using a three-one motor to prepare a spinning stock solution of acrylonitrile-based polymer. Also, 200 grams of methyl polymethacrylate was mixed and dissolved in 600 grams of acetamide by a three-one motor to prepare a spinning stock solution of methyl polymethacrylate.

The acrylonitrile-based polymer spinning stock solution and the methyl polymethacrylate spinning stock solution were mixed, and dimethylacetamide was added to have a total polymer density at 25% by mass. Then, the mixture was blended at room temperature for 60 minutes, and the solution temperature was raised to 70° C. using a hot-water jacket. When the solution temperature reached 70° C., the mixture was blended for 60 minutes.

Next, the temperature of the spinning stock solution was raised to 80° C., and the solution was supplied at a constant rate to a spinning nozzle using a gear pump while maintaining the solution temperature. Then, using a wet spinning method, the spinning stock solution was discharged through the mouthpiece of the nozzle into a coagulation bath (adjusted to have 30% by mass of dimethylacetamide and 70% by mass of water) to be coagulated, and spun to stretch threefold totally.

In particular, wet spinning was conducted as follows: the mixed solution was extruded under a nitrogen atmosphere pressurized at 1 MPa, and discharged by a gear pump through a nozzle with 12000 holes into a dimethylformamide solution (30% by mass of concentration, temperature of 35° C.). The coagulated fiber was stretched threefold in a priming solution, washed and desolventized, and cut to a length of 3 mm. Beating was performed on the fiber by a disc refiner (brand name KRK high-concentration disc refiner, disc clearance of 0.3 mm and rotation of 5000 rpm, made by Kumagai Riki Kogyo). Accordingly, short carbon precursor (b3-2-2-1) fibrillated by beating was obtained.

Example 1

As short carbon fibers (A), 50 parts of PAN-based carbon fiber with an average fiber diameter of 7 μM and an average fiber length of 3 mm, and 50 parts of carbon fiber precursor (b3-2-1-1) with a structure of numerous branched fibrils obtained in manufacturing example 2 were homogeneously dispersed in water and opened well using a mixer. Next, using a standard rectangular sheet machine (brand name No. 2555, made by Kumagai Riki Kogyo), the mixture was dispersed manually on a two-dimensional plane (250 mm long, 250 mm wide) based on ISO-5269-1, and dried. Accordingly, a precursor sheet with a basis weight of 60 g/m² was obtained (step (1)). Short carbon fibers (A) and carbon fiber precursor (b3-2-1-1) with a structure of numer-ous branched fibrils were well dispersed in the precursor sheet. The composition of the precursor sheet is shown in Table 1.

Next, both surfaces of the precursor sheet were sandwiched by paper coated with a silicone-based release agent, and the precursor sheet was hot-press molded for 3 minutes using a batch-pressing apparatus under conditions of 180° C. and 3 MPa (step (4)). The hot-press molded precursor was carbonized for an hour in a batch-type carbonization furnace under nitrogen atmosphere at 2000° C. (step (2)). Accordingly, a porous electrode substrate was obtained.

The obtained porous electrode substrate showed hardly any surface contraction from carbonization, undulation as low as 2 mm or less, handling efficiency, and excellent gas permeability, thickness and electric resistance. The amount of mesh-like carbon (B) was 26%, and the volume contraction rate of fiber precursor (b) was 77%. In addition, it was confirmed that short carbon fibers (A) dispersed in the substrate were bound to each other by mesh-like carbon (B) in the obtained porous electrode substrate. Evaluation results of the obtained porous electrode substrate are shown in table 1.

Example 2

After a precursor sheet was obtained the same as in example 1, a porous electrode substrate was obtained by the same procedure as in example 1 except that step (3) for forming an entangled structure through entanglement treatment was conducted prior to step (4). In particular, first, a sheet-material conveyor equipped as follows was prepared in step (3): a high-pressure water-injection apparatus having a belt formed by connecting 60-cm wide×585-cm long plastic nets of plain mesh, a driver to continuously rotate the belt, and three water-jet nozzles (nozzles (a, b, c)). Next, the precursor sheet was placed on the net of the sheet-material conveyor, and entanglement treatment was conducted by passing the precursor sheet under nozzle (a), nozzle (b) and nozzle (c) in that order at water-injection pressures of 1 MPa (nozzle (a)), 2 MPa (nozzle (b)) and 1 MPa (nozzle (c)).

nozzle (a): aperture size ϕ (diameter) 0.15 mm×501 holes, crosswise hole pitch 1 mm (1001 holes/1 m wide), single row, effective width of nozzle 500 mm.

nozzle (b): aperture size ϕ 0.15 mm×501 holes, crosswise hole pitch 1 mm (1001 holes/1 in wide), single row, effective width of nozzle 500 mm.

nozzle (c): aperture size ϕ 0.15 mm×1002 holes, crosswise hole pitch 1.5 mm, triple row, row pitch 5 mm, effective width of nozzle 500 mm.

The obtained porous electrode substrate showed hardly any surface contraction from carbonization, undulation as low as 2 mm or less, and excellent gas permeability, thickness and through-plane electric resistance. Also, it was confirmed that short carbon fibers (A) dispersed in the substrate were bound to each other by three-dimensional mesh-like carbon (B). Evaluation results are shown in table 1.

Examples 3 and 4

In examples 3 and 4, porous electrode substrates were obtained respectively by conducting the same procedure as in example 2 except that the amount of short carbon fibers (A), the amount of carbon fiber precursor (b3-2-1-1) with a structure of numerous branched fibrils, and the basis weight of the precursor sheet were those shown in table 1. The obtained porous electrode substrate shows the following:

hardly any surface contraction from carbonization, undulation as low as 2 min or less, and excellent gas permeability, thickness and through-plane electric resistance. Also, it was confirmed that short carbon fibers (A) dispersed in the substrate were bound to each other by three-dimensional mesh-like carbon (B). Evaluation results are shown in table 1.

Example 5

A porous electrode substrate was obtained by conducting the same procedure as in example 2 except that short carbon fibers (A), short carbon fiber precursor (b3-1-1) obtained in manufacturing example 1 and carbon fiber precursor (b3-2-1-1) with a branched structure obtained in manufacturing example 2, and that their respective amounts and the basis weight of the precursor sheet were set as shown in table 1. The obtained porous electrode substrate showed hardly any surface contraction from carbonization, undulation as low as 2 mm or less, and excellent gas permeability, thickness and through-plane electric resistance. Also, it was confirmed that short carbon fibers (A) dispersed in the substrate were bound to each other by three-dimensional mesh-like carbon (B). Evaluation results are shown in table 1.

Example 6

A porous electrode substrate was obtained by conducting the same procedure as in example 2 except that short carbon fibers (A) and short carbon fiber precursor (b3-2-2-1) fibrillated by beating obtained in manufacturing example 3 were used, and that their respective amounts and the basis weight of a precursor sheet were set as shown in table 1. The obtained porous electrode substrate showed hardly any surface contraction from carbonization, undulation as low as 2 mm or less, and excellent gas permeability, thickness and through-plane electric resistance. Also, it was confirmed that short carbon fibers (A) dispersed in the substrate were bound to each other by three-dimensional mesh-like carbon (B). Evaluation results are shown in table 1.

Example 7

A porous electrode substrate was obtained by conducting the same procedures as in example 2 except that step (5) for carbonization was conducted between steps (4) and (2). In particular, both surfaces of a hot-press molded precursor sheet were sandwiched by stainless-steel punching plates coated with a silicone-based release agent, and then the precursor was carbonized for one minute using a batch-type pressing apparatus under conditions of 280° C. and 0.5 MPa. The obtained porous electrode substrate showed hardly any surface contraction from carbonization, undulation as low as 2 mm or less, and excellent gas permeability, thickness and through-plane electric resistance. Also, it was confirmed that short carbon fibers (A) dispersed in the substrate were bound to each other by three-dimensional mesh-like carbon (B). Evaluation results are shown in table 1.

Example 8

A porous electrode substrate was obtained by conducting the same procedures as in example 2 except that steps (1), (3) and (2) were conducted in that order without performing hot-press molding (step (4)). The obtained porous electrode substrate showed hardly any surface contraction from carbonization, undulation as low as 2 mm or less, and excellent gas permeability, thickness and through-plane electric resistance. Also, it was confirmed that short carbon fibers (A) dispersed in the substrate were bound to each other by three-dimensional mesh-like carbon (B). Evaluation results are shown in table 1.

Comparative Example 1

A carbon fiber precursor with a structure of numerous branched fibrils was obtained by the same procedure as in manufacturing example 2 except that an acrylonitrile-based polymer having a weight-average molecular weight of 130000, a composite of acrylonitrile/vinyl acetate=93/7 (mass ratio) formed by an aqueous suspension polymerization, was used. Moreover, a porous electrode substrate was obtained by the same procedure as in example 2 except that the carbon fiber precursor with a structure of numerous branched fibrils was used instead of fiber (b3-2-1-1). The obtained porous electrode substrate showed hardly any surface contraction from carbonization, undulation as low as 2 mm or less, and excellent gas permeability and thickness. Also, it was confirmed that short carbon fibers (A) dispersed in the substrate were bound to each other by three-dimensional mesh-like carbon (B). However, the volume contraction rate of the fiber precursor (b) was observed high at 85% and through-plane electric resistance was higher than that of example 2. Evaluation results are shown in table 1.

TABLE 1

| | | precursor sheet | | | | |
| | | | carbon fiber precursor (b3) containing acrylonitrile-based polymer with 95% by mass or more of acrylonitrile units | | | carbon fiber precursor made of acrylonitrile-based polymer containing less than 95% by mass of acrylonitrile units |
| | | | | fibrillar carbon fiber precursor (b3-2) | | |
| | short carbon fibers (A) (part) | short carbon fiber precursor (b3-1-1) (part) | carbon fiber precursor (b3-2-1-1) with numerous branched fibrils (part) | short carbon fiber precursor (b3-2-2-1) fibrillated by beating (part) | carbon fiber precursor with numerous branched fibrils (part) | basis weight (g/m$^2$) |
|---|---|---|---|---|---|---|
| example 1 | 50 | 0 | 50 | 0 | 0 | 60 |
| example 2 | 50 | 0 | 50 | 0 | 0 | 60 |
| example 3 | 20 | 0 | 80 | 0 | 0 | 80 |
| example 4 | 70 | 0 | 30 | 0 | 0 | 55 |

TABLE 1-continued

| | | | | | | |
|---|---|---|---|---|---|---|
| example 5 | 50 | 30 | 20 | 0 | 0 | 60 |
| example 6 | 40 | 0 | 0 | 60 | 0 | 75 |
| example 7 | 50 | 0 | 50 | 0 | 0 | 60 |
| example 8 | 50 | 0 | 50 | 0 | 0 | 60 |
| comparative example 1 | 50 | 0 | 0 | 0 | 50 | 60 |

| | porous electrode substrate | | | | | | |
|---|---|---|---|---|---|---|---|
| | basis weight (g/m²) | thickness (μm) | amount of carbon (B) (%) | gas permeability (mL/hr/cm²/mmAq) | through-thickness resistance (mΩ·cm²) | carbonization rate of carbon fiber precursor (b) (%) | volume contraction rate of carbon fiber precursor (b) (%) |
| example 1 | 41 | 175 | 26 | 5500 | 10.2 | 37 | 77 |
| example 2 | 41 | 172 | 26 | 6500 | 9.3 | 37 | 77 |
| example 3 | 38 | 145 | 58 | 2500 | 8.9 | 34 | 78 |
| example 4 | 44 | 202 | 13 | 7500 | 10.6 | 33 | 79 |
| example 5 | 40 | 183 | 25 | 8000 | 9.2 | 33 | 79 |
| example 6 | 38 | 185 | 21 | 9000 | 10.1 | 36 | 77 |
| example 7 | 43 | 175 | 30 | 5800 | 9 | 43 | 72 |
| example 8 | 39 | 183 | 23 | 7200 | 9.7 | 30 | 81 |
| comparative example 1 | 37 | 172 | 19 | 5000 | 12.6 | 23 | 85 |

(Manufacturing Example 4)

A spinning stock solution containing carbon powder and an acrylonitrile-based polymer was prepared as follows: 117 grams of acrylonitrile-based polymer, a composite of acrylonitrile/vinyl acetate=93/7 (mass ratio) synthesized by aqueous suspension polymerization and having a weight-average molecular weight of 140000, and 83 grams of carbon black (carbon powder) (brand name: #3230B, made by Mitsubishi Chemical Co., Ltd.) were blended and dissolved in 800 grams of dimethylacetamide using a three-one motor. Next, the mixed solution under a nitrogen atmosphere pressurized at 0.1 MPa was extruded, and the mixed solution was supplied at a constant rate by a gear pump to solution channel 1 of the nozzle shown in FIG. 1, while steam was provided through inlet 3 to steam channel 4.

The amount of steam supply was determined by controlling the supply pressure using a decompression valve. The amount of steam was measured by checking the increased amount of steam from the nozzle shown in FIG. 1. The nozzle was prepared to have Y-shaped solution discharge outlet 2, cylindrical mixing cell 5 with a diameter of 2 mm and a length of 10 mm, slit steam channel 4 with an adjusted aperture of 390 μm, and angle (C) set at 60 degrees between the center line of solution channel 1 (the same as discharge line (A) of spinning stock solution) and the center line of steam channel 4 (the same as steam injection line (B)).

Using the nozzle, the mixed solution was injected into 30° C. water from mixing cell outlet 6 by setting the supply amount of mixed solution at 36 mL/min. and the supply pressure of steam at 350 kPa. A coagulated mixture of acrylonitrile-based polymer and carbon powder floating in a coagulation bath was collected, cleansed overnight at room temperature, and dewatered. Accordingly, fibrillar carbon fiber precursor (b1-2) containing carbon powder was obtained. The freeness of fibrillar carbon fiber precursor (b1-2) containing carbon powder was 90 mL.

Water was added to fibrillar carbon fiber precursor (b1-2) containing carbon powder to make the fiber density 1% by mass, and the precursor was refined using a disc refiner (brand name: KRK high-concentration disc refiner, disc clearance of 0.3 mm and rotation of 5000 rpm, made by Kumagai Riki Kogyo) to obtain slurry. The slurry was made into 25 cm×25 cm sheet with a basis weight of 30 g/m², and dried for a contact drying time of 3 minutes using a drum dryer (brand name HP-124AP, made by Hashima) set at 130° C. to form a sheet. When the obtained sheet was observed using a scanning electron microscope, the fiber was confirmed to be fibrillated.

Example 9

The following were homogeneously dispersed in water and opened well using a mixer: as short carbon fibers (A), 50 parts of PAN-based carbon fiber with an average fiber diameter of 7 μm and an average fiber length of 3 mm; and 50 parts of fibrillar carbon fiber precursor (b1-2) containing carbon powder obtained in manufacturing example 4. Next, using a standard rectangular sheet machine (brand name No. 2555, made by Kumagai Riki Kogyo), the mixture was dispersed manually in a two-dimensional plane (250 mm long×250 mm wide) based on ISO-5269-1, and dried. Accordingly, a precursor sheet with a basis weight of 60 g/m² was obtained (step (1)). Short carbon fibers (A) and fibrillar carbon fiber precursor (b1-2) containing carbon powder were well dispersed in the precursor sheet.

Next, both surfaces of the precursor sheet were sandwiched by paper coated with a silicone-based release agent and hot-press molded for 3 minutes using a batch-pressing apparatus under conditions of 180° C. and 3 MPa (step (4)). The hot-press molded precursor sheet was carbonized for an hour in a batch-type carbonization furnace under nitrogen gas atmosphere at 2000° C. (step (2)). Accordingly, a porous electrode substrate was obtained.

Figure 2:
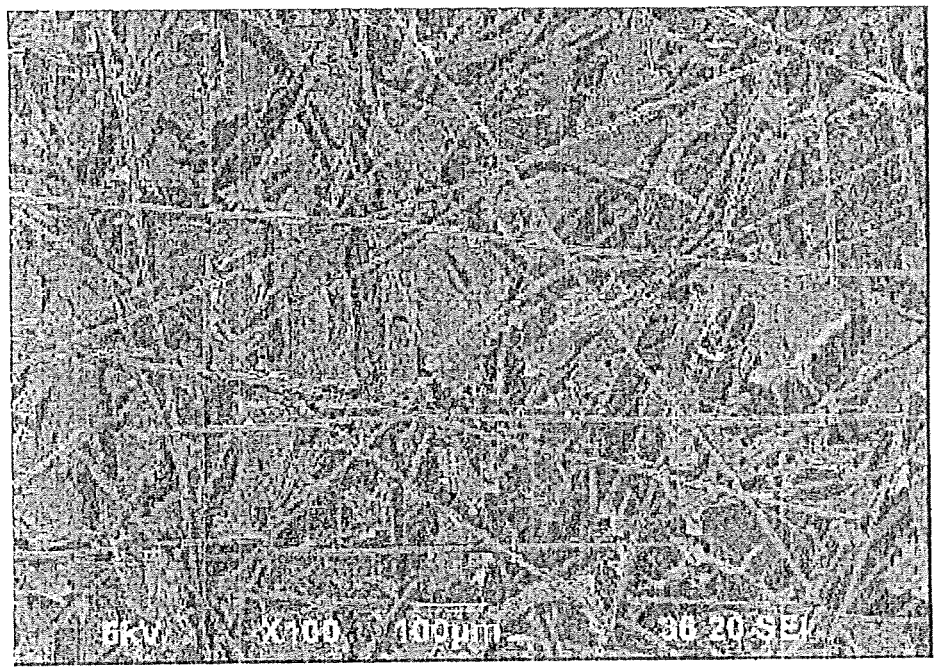
FIG. 2 a photograph taken using a scanning electron microscope showing a surface of a porous electrode substrate (the one obtained in example 10) according to an embodiment of the present invention.

The obtained porous electrode substrate showed hardly any surface contraction from carbonization, undulation as low as 2 mm or less, handling efficiency, and excellent gas permeability, thickness and through-plane electric resistance. The amount of mesh-like carbon (B) containing carbon powder was 44%, and the volume contraction rate of fiber precursor (b) was 51%. Also, as its surface photograph taken by a scanning electron microscope shows in FIG. 2, it was confirmed that short carbon fibers (A) dispersed in the two-dimensional plane of the obtained porous electrode substrate were bound to each other by mesh-like carbon (B) containing carbon powder. Evaluation results are shown in table 2.

Examples 10 and 11

Porous electrode substrates were obtained respectively by conducting the same procedure as in example 9 except that the amount of short carbon fibers (A), the amount of fibrillar carbon fiber precursor (b1-2) containing carbon powder, and the basis weight of the precursor sheet were set as shown in table 2 respectively. The obtained porous electrode substrate showed hardly any surface contraction from carbonization, undulation as low as 2 mm or less, and excellent gas permeability, thickness and through-plane electric resistance. Also, it was confirmed that short carbon fibers (A) dispersed in a two-dimensional plane were bound to each other by mesh-like carbon (B) containing carbon powder. Evaluation results are shown in table 2.

Example 12

A porous electrode substrate was obtained by conducting the same procedures as in example 9 except that after both surfaces of a hot-press molded precursor sheet were sandwiched by stainless-steel punching plates coated with a silicone-based release agent, the precursor was carbonized for one minute using a batch-type pressing apparatus under conditions of 280° C. and 0.5 MPa (step (5)). The obtained porous electrode substrate showed hardly any surface contraction from carbonization, undulation as low as 2 mm or less, and excellent gas permeability, thickness and through-plane electric resistance. Also, it was confirmed that short carbon fibers (A) dispersed in a two-dimensional plane were bound to each other by mesh-like carbon (B) containing carbon powder. Evaluation results are shown in table 2.

Example 13

A porous electrode substrate was obtained by the same procedure as in example 9 except that hot-press molding (step (4)) was not performed. The obtained porous electrode substrate showed hardly any surface contraction from carbonization, undulation as low as 2 mm or less, and excellent gas permeability, thickness and through-plane electric resistance. Also, it was confirmed that short carbon fibers (A) dispersed in a two-dimensional plane were bound to each other by mesh-like carbon (B) containing carbon powder. Evaluation results are shown in table 2.

Example 14

After a precursor sheet was obtained the same as in example 9, a porous electrode substrate was obtained by the same procedure as in example 13 except that step (3) for forming an entangled structure through entanglement treatment was conducted prior to step (4). In particular, first, a sheet-material conveyor such as follows was prepared in step (3): a high-pressure water-injection apparatus equipped with a belt formed by connecting 60-cm wide×585-cm long plastic nets of plain mesh, a driver to continuously rotate the belt and three water-jet nozzles (nozzles (a, b, c)). Next, the precursor sheet was loaded on the net of the sheet-material conveyor, and entanglement treatment was performed by passing the precursor sheet under nozzle (a), nozzle (b) and nozzle (c) in that order at water-injection pressures of 1 MPa (nozzle (a)), 2 MPa (nozzle (b)) and 1 MPa (nozzle (c)).

The obtained porous electrode substrate showed hardly any surface contraction from carbonization, and excellent gas permeability, thickness and through-plane electric resistance. Also, it was confirmed that short carbon fibers (A) dispersed in the three-dimensional structure were bound to each other by three-dimensional mesh-like carbon (B) containing carbon powder. Evaluation results are shown in table 2.

Example 15

The amounts of combining an acrylonitrile-based polymer, carbon black (carbon powder) (brand name: #3230B, made by Mitsubishi Chemical Co., Ltd.) and dimethylacetamide were set at 134 grams, 41 grams and 835 grams respectively to prepare a spinning stock solution containing carbon powder and an acrylonitrile-based polymer. Then, a fibrillar carbon fiber precursor (b1-2) containing carbon powder was obtained by the same method as in manufacturing example 4 except that the pressure for supplying steam was set at 450 kPa. Moreover, a porous electrode substrate was obtained by the same procedure as in example 9 except for using the above fibrillar carbon fiber precursor (b1-2) containing carbon powder. The obtained porous electrode substrate showed hardly any surface contraction from carbonization, undulation as low as 2 mm or less, and excellent gas permeability, thickness and through-plane electric resistance. Also, it was confirmed that short carbon fibers (A) dispersed in a two-dimensional plane were bound to each other by mesh-like carbon (B) containing carbon powder. Evaluation results are shown in table 2.

Example 16

A fibrillar carbon fiber precursor (b1-2) containing carbon powder was obtained by the same procedure as in example 15 except that acetylene black (brand name: Denka Black, made by Denki Kagaku Kogyo K.K.) was used as carbon powder. Moreover, a porous electrode substrate was obtained by the same procedure as in example 9 except for using the fibrillar carbon fiber precursor (b1-2) containing carbon powder. The obtained porous electrode substrate showed hardly any surface contraction from carbonization, undulation as low as 2 mm or less, and excellent gas permeability, thickness and through-plane electric resistance. Also, it was confirmed that short carbon fibers (A) dispersed in a two-dimensional plane were bound to each other by mesh-like carbon (B) containing carbon powder. Evaluation results are shown in table 2.

Example 17

A fibrillar carbon fiber precursor (b1-2) containing carbon powder was obtained by the same method as in manufacturing example 4 except that the acrylonitrile-based polymer used in manufacturing example 3 was used. The fibrillar carbon fiber precursor (b1-2) is made up of acrylonitrile-based polymer (I) and carbon powder. Moreover, a porous electrode substrate was obtained by the same procedure as in example 14 except for using the fibrillar carbon fiber precursor (b1-2). The obtained porous electrode substrate showed hardly any surface contraction from carbonization, undulation as low as 2 mm or less, and excellent gas permeability, thickness and through-plane electric resistance. Also, it was confirmed that short carbon fibers (A) dispersed in a two-dimensional plane were bound to each other by three-dimensional mesh-like carbon (B) containing carbon powder. Evaluation results are shown in table 2.

Comparative Example 2

The amounts of combining an acrylonitrile-based polymer and dimethylacetamide were set at 150 grams and 850 grams respectively and carbon powder was not used to prepare a spinning stock solution of an acrylonitrile-based polymer that does not contain carbon powder. A fibrillar carbon fiber precursor that does not contain carbon powder was obtained by the same procedure as in manufacturing example 4 except for using the prepared spinning stock solution. Then, a porous electrode substrate was obtained by the same procedure as in example 9 except for using the fibrillar carbon fiber precursor that does not contain carbon powder. The obtained porous electrode substrate showed hardly any surface contraction from carbonization, undulation as low as 2 mm or less, and excellent gas permeability and thickness, and it was confirmed that short carbon fibers (A) dispersed in a two-dimensional plane were bound to each other by mesh-like carbon (B) that does not contain carbon powder. However, the through-plane electric resistance was higher than that in example 2, and the carbonization rate during carbonization was smaller than that of example 2. Evaluation results are shown in table 2.

Comparative Example 3

A porous electrode substrate was obtained by the same procedure as in example 9 except that short carbon fibers (A) were not used and the amount of fibrillar carbon fiber precursor (b1-2) containing carbon powder was set at 100 parts. However, the obtained porous electrode substrate could not maintain a sheet-type structure due to contraction during the carbonization of fibrillar carbon fiber precursor (b1-2) containing carbon powder. Therefore, each physical property of the porous electrode substrate was not measured.

TABLE 2

| | precursor sheet | | | | porous electrode substrate | | |
|---|---|---|---|---|---|---|---|
| | | fibrillar carbon fiber precursor (b1-2) with carbon powder | | fibrillar carbon fiber precursor without carbon powder | | | |
| | short carbon fiber (A) (part) | carbon fiber precursor with numerous branched fibrils (part) | freeness of carbon fiber precursor with numerous branched fibrils (mL) | carbon fiber precursor with numerous branched fibrils (part) | basis weight (g/m$^2$) | basis weight (g/m$^2$) | thickness (μm) |
| example 9 | 50 | 50 | 90 | 0 | 60 | 53 | 192 |
| example 10 | 25 | 75 | 90 | 0 | 70 | 58 | 165 |
| example 11 | 80 | 20 | 90 | 0 | 50 | 48 | 192 |
| example 12 | 50 | 50 | 90 | 0 | 60 | 54 | 185 |
| example 13 | 50 | 50 | 90 | 0 | 60 | 53 | 199 |
| example 14 | 50 | 50 | 90 | 0 | 60 | 53 | 191 |
| example 15 | 50 | 50 | 50 | 0 | 60 | 43 | 165 |
| example 16 | 50 | 50 | 70 | 0 | 60 | 43 | 162 |
| example 17 | 50 | 50 | 90 | 0 | 60 | 53 | 192 |
| comparative example 2 | 50 | 0 | — | 50 | 60 | 56 | 166 |
| comparative example 3 | 0 | 100 | 90 | 0 | 60 | — | — |

| | porous electrode substrate | | | | |
|---|---|---|---|---|---|
| | amount of carbon (B) (%) | gas permeability (mL/hr/cm$^2$/mmAq) | through-thickness resistance (mΩ·m$^2$) | carbonization rate of cabon fiber precursor (b) (%) | volume contraction rate of carbon fiber precursor (b) (%) |
| example 9 | 44 | 2200 | 10.9 | 77 | 51 |
| example 10 | 46 | 1200 | 8.8 | 77 | 51 |
| example 11 | 16 | 3500 | 9.8 | 80 | 49 |
| example 12 | 44 | 2300 | 10.2 | 80 | 49 |
| example 13 | 44 | 2600 | 11.1 | 77 | 51 |
| example 14 | 44 | 2600 | 10.4 | 77 | 51 |
| example 15 | 29 | 3100 | 10.2 | 43 | 72 |
| example 16 | 29 | 3300 | 11.3 | 43 | 72 |
| example 17 | 44 | 2200 | 10.9 | 77 | 47 |
| comparative example 2 | 19 | 3000 | 13.8 | 23 | 85 |
| comparative example 3 | — | — | — | — | — |

DESCRIPTION OF NUMERICAL REFERENCES

1: channel for spinning stock solution for manufacturing split fibers
2: outlet for spinning stock solution for manufacturing split fibers
3: steam inlet 4: slit steam channel
5: mixing cell
6: outlet of mixing cell
A: discharge line of spinning stock solution for manufacturing split fibers
B: steam injection line
C: angle of lines A and B
7: line parallel to sheet surface

The invention claimed is:

1. A method for manufacturing a porous electrode substrate, the method comprising hot pressing a precursor sheet, wherein said hot pressing is at a temperature ranging from 120 to 200° C. and at a pressure ranging from 20 kPa to 10 MPa and carbonizing the precursor sheet, wherein the precursor sheet comprises short carbon fibers (A) and carbon fiber precursor (b) dispersed therein, wherein a volume contraction rate of the carbon fiber precursor (b) is from 47% to 79% during the carbonizing, wherein the carbonizing is conducted at a temperature of at least 1000° C., and wherein the carbon fiber precursor (b) is at least one of: a short carbon fiber precursor comprising an acrylonitrile-based polymer with 95% by mass or more of acrylonitrile units; and a fibrillar carbon fiber precursor comprising an acrylonitrile-based polymer with 95% by mass or more of acrylonitrile units.

2. The method according to claim 1, wherein the carbon fiber precursor (b) comprises carbon powder.

3. The method according to claim 1, further comprising entangling the precursor sheet before the hot pressing.

4. The method according to claim 1, further comprising oxidizing the precursor sheet between the carbonizing and the hot pressing steps.

5. The method according to claim 1, wherein the carbonizing is conducted at a temperature of 1000° C. to 3000° C.

6. The method according to claim 1, wherein the carbonizing is conducted at a temperature of 1000° C. to 2200° C.

7. A porous electrode substrate obtained by the method of claim 1.

8. A membrane electrode assembly, comprising the porous electrode substrate according to claim 7.

9. A solid electrolyte polymer fuel cell, comprising the membrane electrode assembly according to claim 8.

* * * * *